United States Patent [19]

Honma et al.

[11] 4,260,241
[45] Apr. 7, 1981

[54] COPYING APPARATUS

[75] Inventors: Toshio Honma, Tokyo; Katsushi Furuichi, Yokohama; Katsumi Murakami; Masahiro Tomosada, both of Kawasaki, all of Japan

[73] Assignee: Canon Kabushiki Kaisha, Tokyo, Japan

[21] Appl. No.: 39,159

[22] Filed: May 15, 1979

[30] Foreign Application Priority Data

May 17, 1978 [JP] Japan .................................. 53/58466
Dec. 28, 1978 [JP] Japan .................................. 53/164828

[51] Int. Cl.³ .......................................... G03G 15/00
[52] U.S. Cl. ................................. 355/14 R; 355/3 SH; 355/8
[58] Field of Search ............. 355/3 SH, 3 SC, 14 SH, 355/14 R, 8, 3 TR; 271/245, 246

[56] References Cited

U.S. PATENT DOCUMENTS

| 3,951,540 | 4/1976 | Ogawa | 355/8 |
| 4,009,957 | 3/1977 | Suzuki et al. | 355/8 X |
| 4,025,187 | 5/1977 | Taylor et al. | 355/14 SH |
| 4,026,647 | 5/1977 | Kanno et al. | 355/14 SH |
| 4,071,295 | 1/1978 | Komori et al. | 355/3 SH |
| 4,129,377 | 12/1978 | Miyamoto et al. | 355/3 SH |

Primary Examiner—Richard L. Moses
Attorney, Agent, or Firm—Fitzpatrick, Cella, Harper & Scinto

[57] ABSTRACT

A copying apparatus comprises a recording medium, process means for forming an image on the recording medium including image transfer means for transferring the image formed on the recording medium to a transfer medium, feed means for feeding the transfer medium to an image transfer station, memory means for storing the operating time of the feed means so that the leading end of the image on the recording medium and the leading end of the transfer medium are brought into a predetermined relationship, and control means responsive to the output of the memory means to control the time whereat the feed means operates.

39 Claims, 58 Drawing Figures

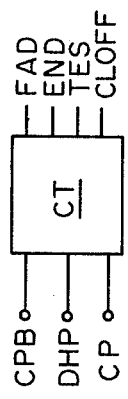
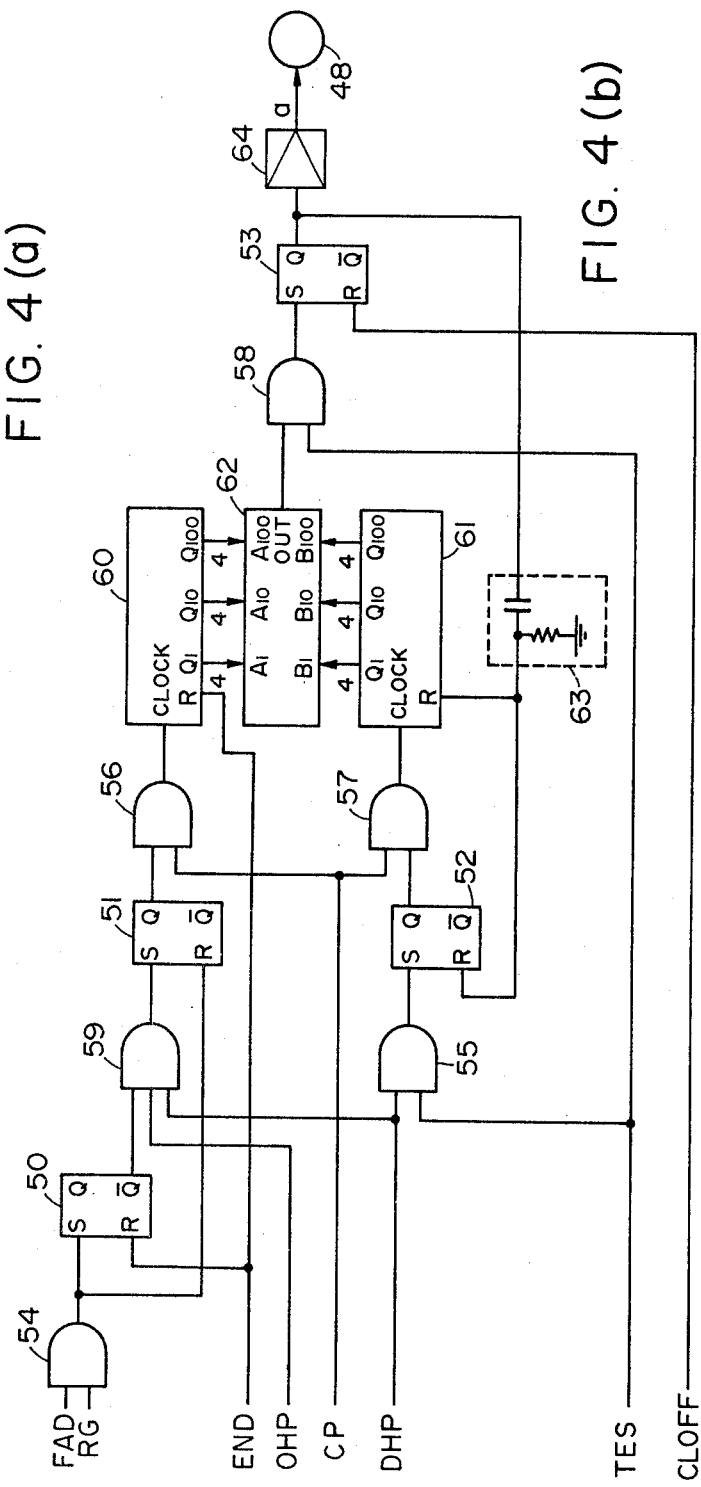
FIG. 4(a)
FIG. 4(b)

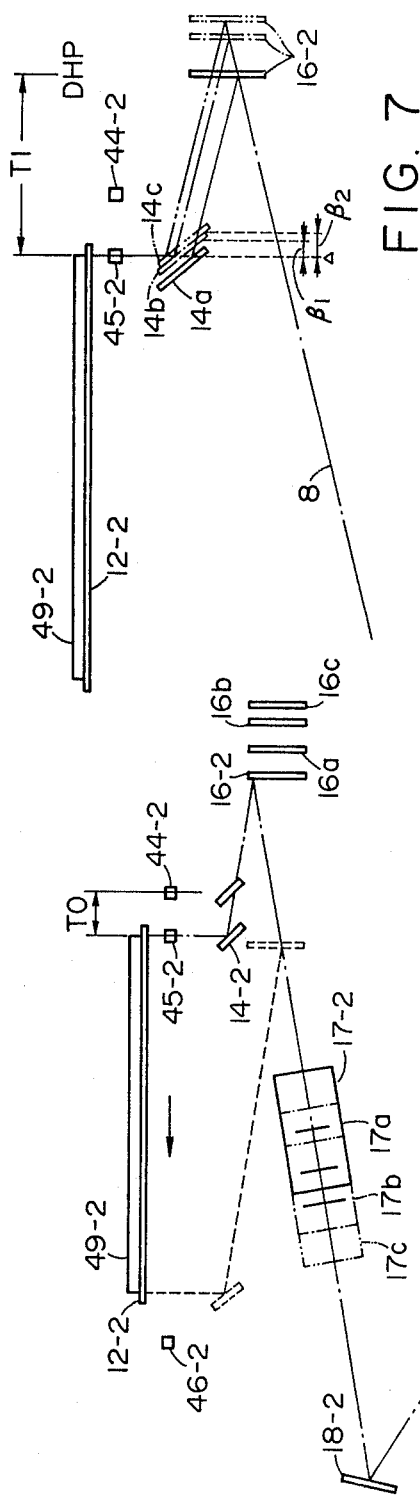
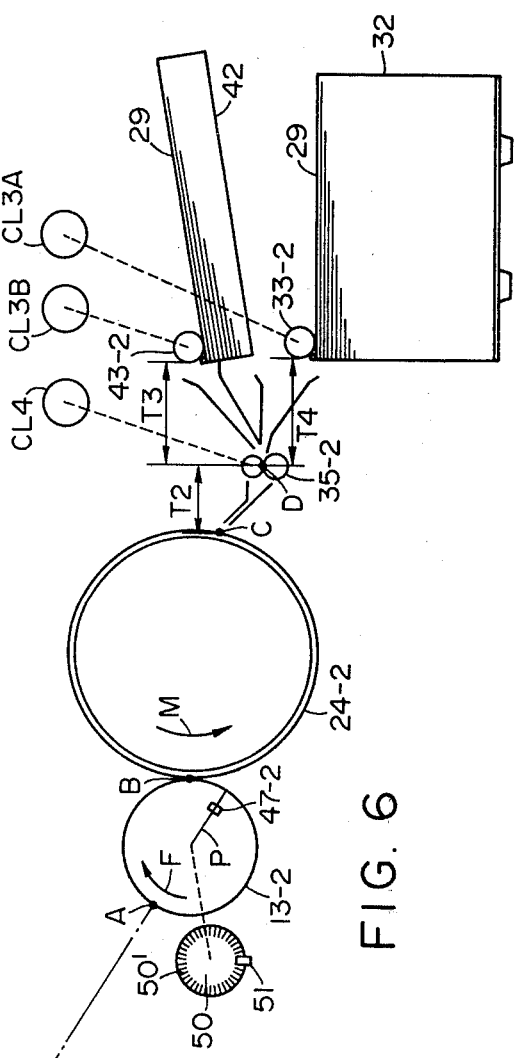
FIG. 7
FIG. 6

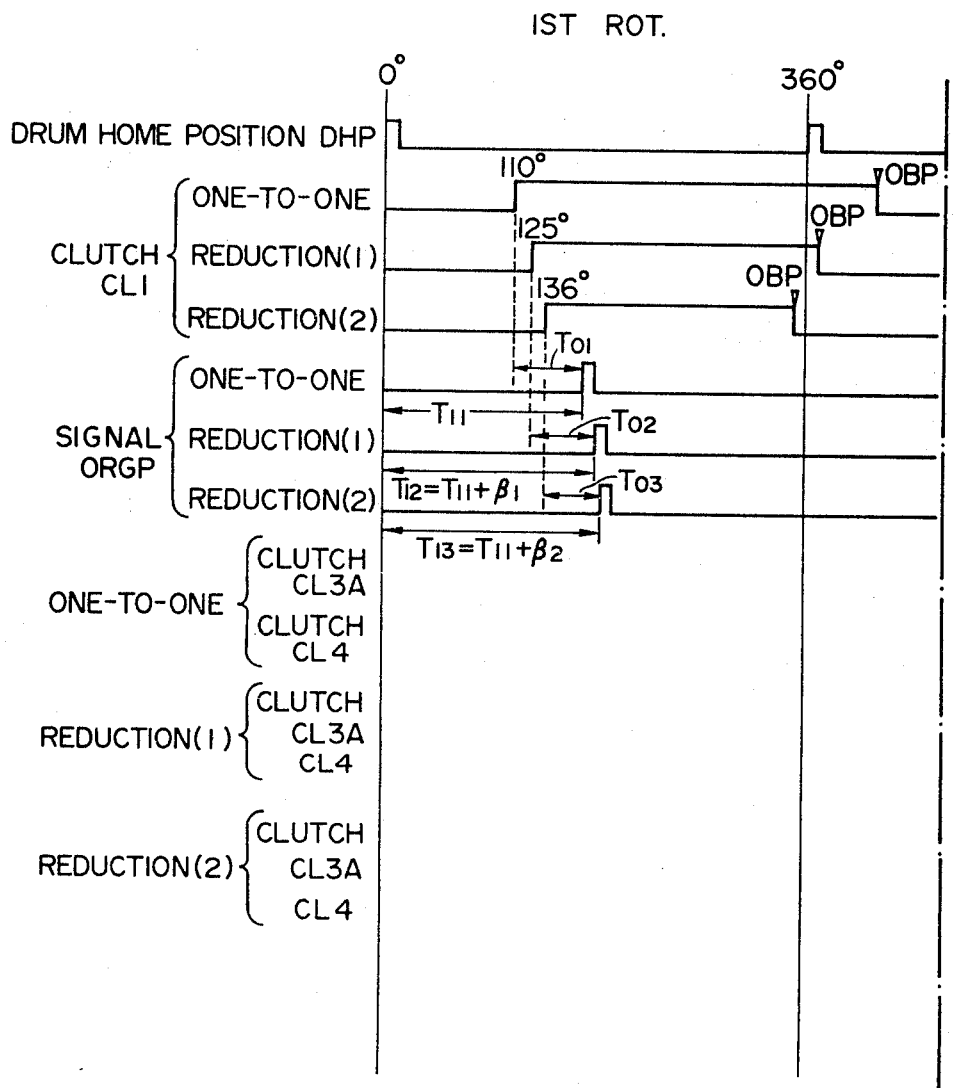

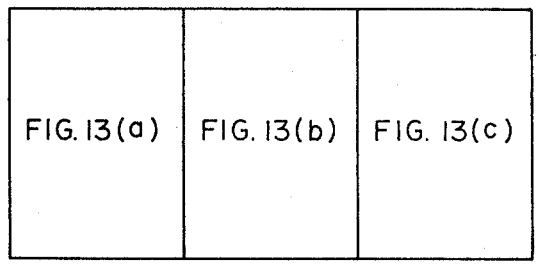
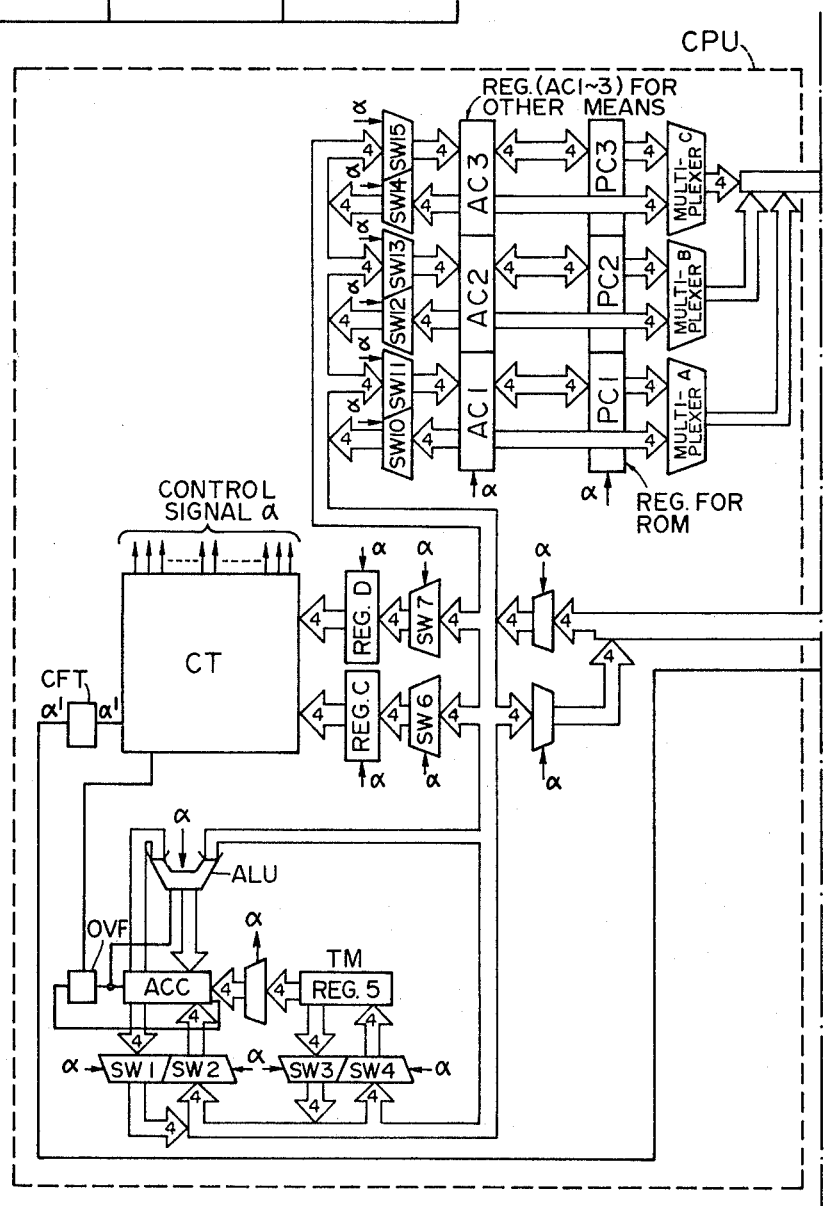
FIG. 13(a)

| | 8 | 9 | A | B | C | D | E | F |
|---|---|---|---|---|---|---|---|---|
| | WR(2) FLAG PF1 | WA(2) PF-CNT1 | | | WR(3) SJP-CNT | WA(3) RG-CNT1 | | |
| | WR(6) | WA(6) | | | WR(7) | WA(7) | | |
| | | | (100) (10) (1) SET NO. | | | | | |
| | | | (100) (10) (1) CNT1 COPY NO. | | | | | |
| | | | SIDING SET NO. UPON JAM SET NO. — COPY NO. | | | | | |
| | | | | | | | | |
| | | PF-CNT 2 | | | | RG-CNT 2 | | |
| | | | | | | | | |
| | | | | | | | | |
| | | | | | | | | |
| | | | | | | | | |
| | | | | | | | | |
| | | | | | | | | |
| | | | | | | | | |
| | 7 | 6 | 5 | 4 | 3 | 2 | 1 | 0 |
| | 8 | 9 | A | B | C | D | E | F |

FIG. 14(b)

COPYING APPARATUS

BACKGROUND OF THE INVENTION

1. Field of the Invention

This invention relates to a copying apparatus, and more particularly to a copying apparatus in which the feeding time of a recording medium is controlled so that the relative position of an image to be formed on the recording medium and the recording medium is brought into a predetermined relationship.

2. Description of the Prior Art

In an electrophotographic copying apparatus, in order to register the leading end of transfer paper with the leading end of an image formed on a photosensitive medium by exposure and development, a predetermined rotated position of the photosensitive medium has been detected to operate a feed roller to feed the transfer paper to an image transfer station. However, this has offered a disadvantage that since the start of an optical system or an original carriage reciprocating to subject the photosensitive medium to exposure and scanning is not always constant, a latent image is not always formed at a predetermined location on the photosensitive medium and accordingly, the leading end of the image on the transfer paper is deviated. To overcome such a disadvantage, there is an apparatus in which a particular moved position of the optical system or the original carriage in their path is detected to operate a feed roller, but in such apparatus, the feeding time has been limited during the reciprocal movement of the optical system on the original carriage. Thus, this has not been applicable to copying machines in which image transfer takes place independently of the exposure and scanning.

Also, in copying machines wherein copying magnification is variable, the time relation between the timing for detecting a particular position of reciprocal movement and the feed timing differs in accordance with the magnification and the feed timing cannot indiscriminately be determined from the detection timing. This has also been the case with copying machines having a plurality of paper feed stations and having different lengths of feed paths for the respective paper feed stations.

SUMMARY OF THE INVENTION

The present invention eliminates the above-noted disadvantages peculiar to the prior art. According to the present invention, the feeding time for the registration is preset and it is stored for a predetermined time, and the feed roller is operated by the stored time signal. Moreover, this stored time signal may be restored to ensure an image to be formed always at a predetermined location on a transfer medium even in copying machines having different image transfer modes. The present invention is featurized in that it comprises a recording medium, process means for forming an image on the recording medium, means for repetitively feeding a transfer medium to the recording medium to transfer the image formed on the recording medium to the transfer medium, means for presetting the time for operating the feed means so that the leading end of the transfer medium and the leading end of the image on the recording medium are brought into a predetermined positional relationship and for storing the preset time for a predetermined time, and control means for repetitively operating the feed means by the stored signal of the storage means. The present invention is further featurized in that the moved position of reciprocable means for illuminating and scanning an original image is detected to set the storage means. The present invention is still further featurized in that a first latent image is formed on a first recording medium by the reciprocable means, a second latent image is formed on a second recording medium by the first latent image, the latent image is developed and when the developed image is transferred to the transfer medium, the feed means is repetitively operated by the storage means so that the same first latent image may be transferred to a plurality of transfer mediums. Also, the feed means is operated when the time signal generated in synchronism with the rotation of the recording medium has become coincident with the stored value stored by the storage means.

It is also possible to effect the storage and setting by directly detecting the leading end of the latent image by a potential measuring device or the like. Further, where the image exposure is effected while the original (sheet) itself is transported, the storage and setting may be accomplished by detecting the transported position of the original itself. The above-described position detection can be accomplished by actuating a microswitch, a photoelectric element or a Hall element provided in the path of movement by a cam, a light-emitting member or a magnet provided on the original carriage or the optical system. The detection of the position of the original itself may be accomplished by actuating the microswitch by the original or by detecting the reflected light from the light-emitting member provided in the path of movement.

The present invention also intends to provide a copying control system for presetting the time for operating the feed means in accordance with a plurality of copying magnifications, storing the preset time for a predetermined time and controlling the feed means.

The invention will become more fully apparent from the following detailed description thereof taken in conjunction with the accompanying drawings.

BRIEF DESCRIPTION OF THE DRAWINGS

FIGS. 4(a) and (b) are diagrams of the control circuit in the first embodiment.

FIG. 6 illustrates the manner of taking the registration timing in a second embodiment.

FIG. 7 illustrates the registered position of the optical system in the second embodiment.

FIGS. 8, 8a, 8b illustrate the registration timing in the second embodiment.

FIGS. 13, 13a-13c is a diagram of the control circuit in the second embodiment.

FIGS. 14, 14a, 14b show the map of RAM in the control circuit of FIG. 13.

DESCRIPTION OF THE PREFERRED EMBODIMENTS

Figure 1:
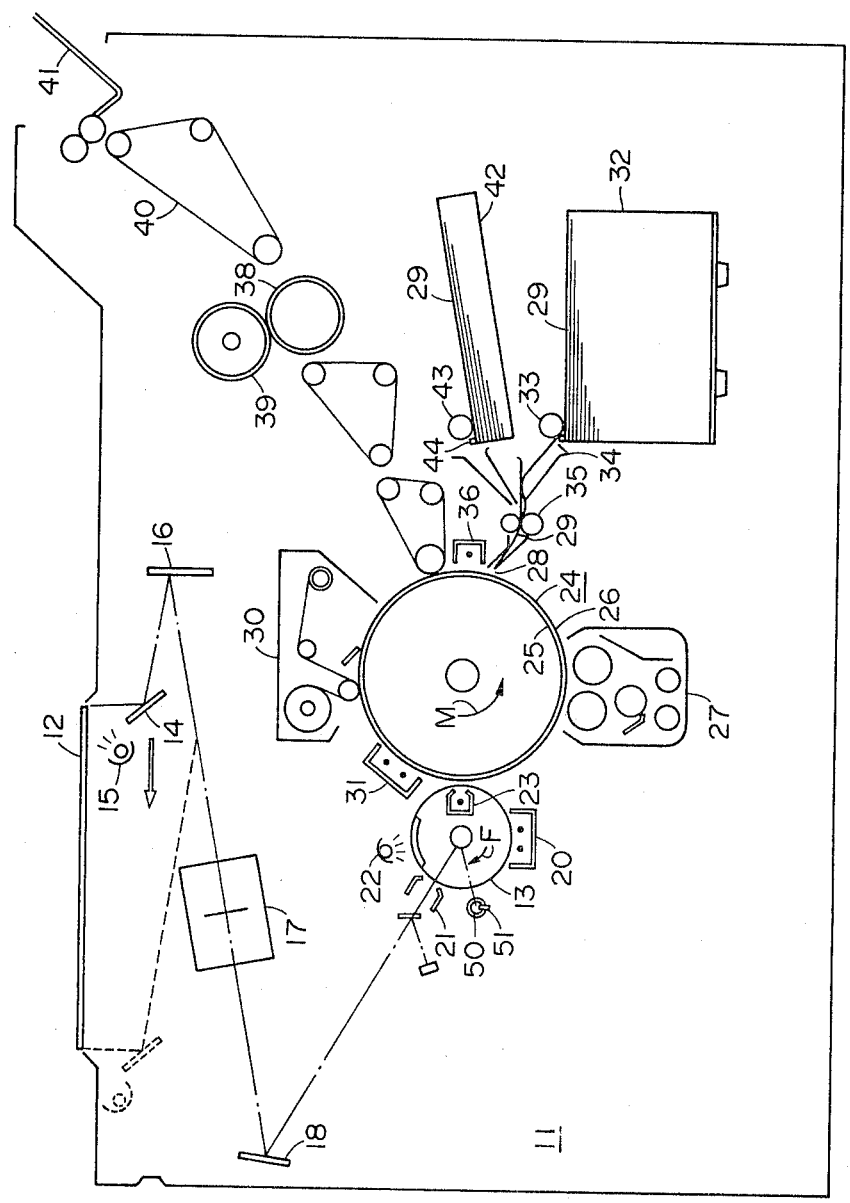
FIG. 1 is a cross-sectional view of a retention type copying apparatus.

Referring to FIG. 1, it is a cross-sectional view of a copying apparatus of the retention type to which the control system of the present invention is applicable.

Designated by 11 is a housing surrounding the apparatus. An original such as a literature or document is placed on an original carriage 12 formed by a transparent member such as glass plate or the like on top of the housing 11. This original carriage is of the fixed type and the projection of the image onto a screen drum 13, which will later be described, is effected by movement of a part of optical means. The optical means is well-known and a first mirror 14 and an original illuminating lamp 15 are movable over the entire stroke of the original carriage 12 from their full-line position to their leftmost dotted-line position at a velocity V. On the other hand, simultaneously with the movement of the first mirror 14 effected for scanning the original carriage 12, a second mirror 16 is movable from its full-line position to its leftmost dotted-line position at a velocity V12. The original image obtained by the scanning of the first and second mirrors 14 and 16 is projected via a lens system 17 having a diaphragm mechanism and a stationary mirror 18 onto the screen drum 13 whose peripheral velocity is V. The screen drum 13 comprises a mesh-like drum consisting of an electrically conductive layer, a photoconductive layer laid over the conductive layer, and a transparent insulating layer laid over the photoconductive layer, and may be, for example, such as that disclosed in our U.K. Specification No. 1480841.

The drum 13 is rotatable in the direction of arrow F, and latent image formation means are disposed adjacent to and along the periphery of the screen drum 13. Reference numeral 20 designates a corona discharger which is a primary voltage applying means and which may charge the rotating screen drum 13 to a sufficient voltage. Designated by 21 is a corona discharger which is a secondary voltage applying means and which may form a primary electrostatic latent image by discharging the charge on the screen drum 13 imparted by the discharger 20 while the original image is projected onto the drum 13. For this purpose, the discharger 21 has its back shield plate optically open. Denoted by 22 is a whole surface illuminating lamp which may uniformly illuminate the screen drum 13 and rapidly enhance the electrostatic contrast of the primary electrostatic latent image. By the abovedescribed means, a primary electrostatic latent image with a high electrostatic contrast may be formed on the screen drum 13. The primary electrostatic latent image thus formed on the screen drum 13 may further be formed as a secondary electrostatic latent image on an insulating drum 24 rotated in the direction of arrow M, by a modulating corona discharger 23. The insulating drum 24 comprises an electrically conductive back-up member 25 covered with an insulating layer 26, and the secondary electrostatic latent image is formed by applying a voltage between the conductive back-up member 25 and the conductive member of the screen drum 13 and directing modulation corona ions to the surface of the insulating layer 26. The secondary electrostatic latent image so formed on the insulating layer 24 may be developed into a toner image by a known liquid type or dry type developing device (developing means) 27. Then, the toner image may be transferred onto a transfer medium (paper leaf) 29 conveyed to an image transfer station 28 in synchronism with the toner image. After the image transfer, the insulating drum 24 may be cleaned by a known cleaner (cleaning means) 30 using a blade or a brush to remove any remaining toner on the insulating layer 26, and rendered to a uniform surface potential by a corona discharger 31, thus becoming ready for another cycle of copying.

Transfer mediums 29 to be conveyed to the image transfer station 28 are piled in a lower cassette 32 and an upper cassette 42 and are separated one by one by feed rollers 33, 43 and separating panels 34, 44, respectively and conveyed to the toner image position by a register roller 35. The lower cassette 32 can contain 2,000 to 3,000 sheets of paper and the upper cassette can contain 500 to 1,000 sheets of paper. Designated by 36 is a discharger for applying a bias voltage to the transfer medium when the toner image is transferred by the image transfer corona discharger. After the image transfer, the transfer medium 29 is separated from the insulating drum 24 by a separating belt (not shown) and directed to a fixing device 38, where the toner image on the transfer medium is fixed by a fixing roller 39, whereafter the transfer medium is conveyed to a finished transfer medium tray 41. The above-described copying apparatus is of the so-called retention type in which once a primary electrostatic latent image is formed on the screen drum 13, this primary electrostatic latent image is utilized to form a secondary electrostatic latent image, and therefore it is not necessary to again scan the original when a plurality of copies are to be produced.

Thus, when a plurality of copies are to be produced, only the processes subsequent to the secondary electrostatic latent image formation need be operated and therefore, it is possible to increase the copying speed by increasing the rotational speed of the screen drum 13 to two or three times the rotational speed for its primary latent image formation during these processes by the use of a known clutch, gears and the like.

Figure 2:
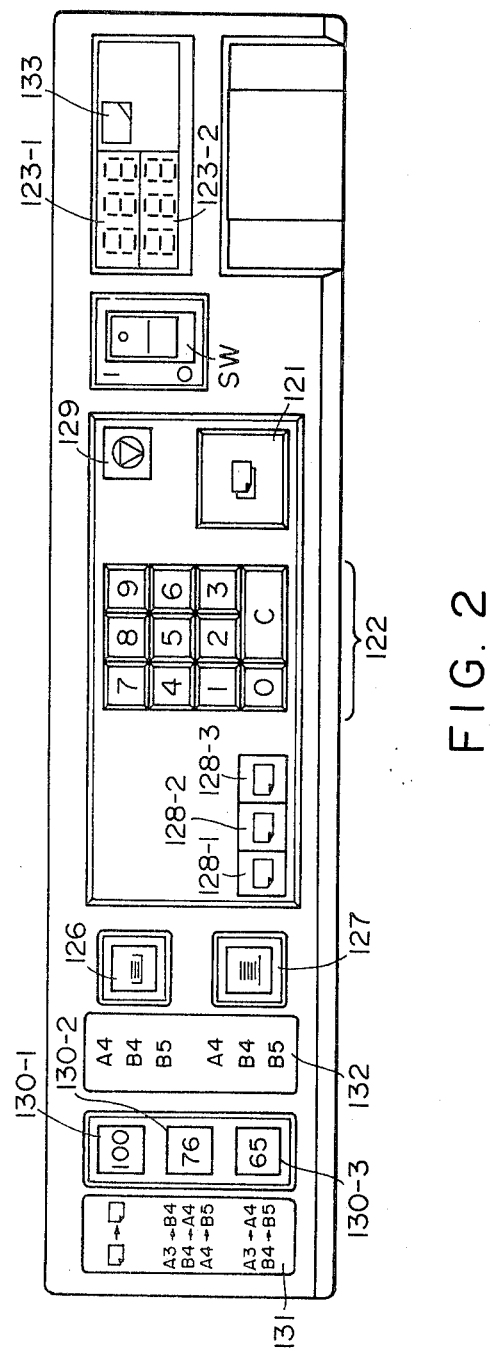
FIG. 2 shows the operating portion of the copying apparatus of FIG. 1.

FIG. 2 shows the operating portion and display panel of the FIG. 1 apparatus. Designated by SW is a main switch for connecting the process load control circuit of the copying apparatus to a power source. Denoted by 121 is a copy start key, 122 a key for setting the number of copies, 123-1 a set number indicator, and 123-2 a copy end indicator which indicates the number of completed copies with the aid of 7-segment LED.

Designated by 126 and 127 are upper and lower paper feed cassette selecting keys which may be turned on by the closing of itself to display the selection and also display the size of the paper in the upper and the lower cassette by a paper size indicator 132. Reference characters 128-1 to 128-3 denote keys for selecting light and shade. They respectively set the shade, half-tone and light and are turned on by the closing of itself to display the selected tone. Denoted by 129 is a stop key for stopping the copying operation. Reference numerals 130-1 to 130-3 denote magnification change designating keys which respectively set one-to-one magnification, 0.76 times (hereinafter referred to as the reduction (1)) and 0.65 times (hereinafter referred to as the reduction (2)) and which may turn on the corresponding location of an indicator 131.

Detailed description will hereinafter be made of the register timing which forms an essential portion of the present invention.

Figure 3:
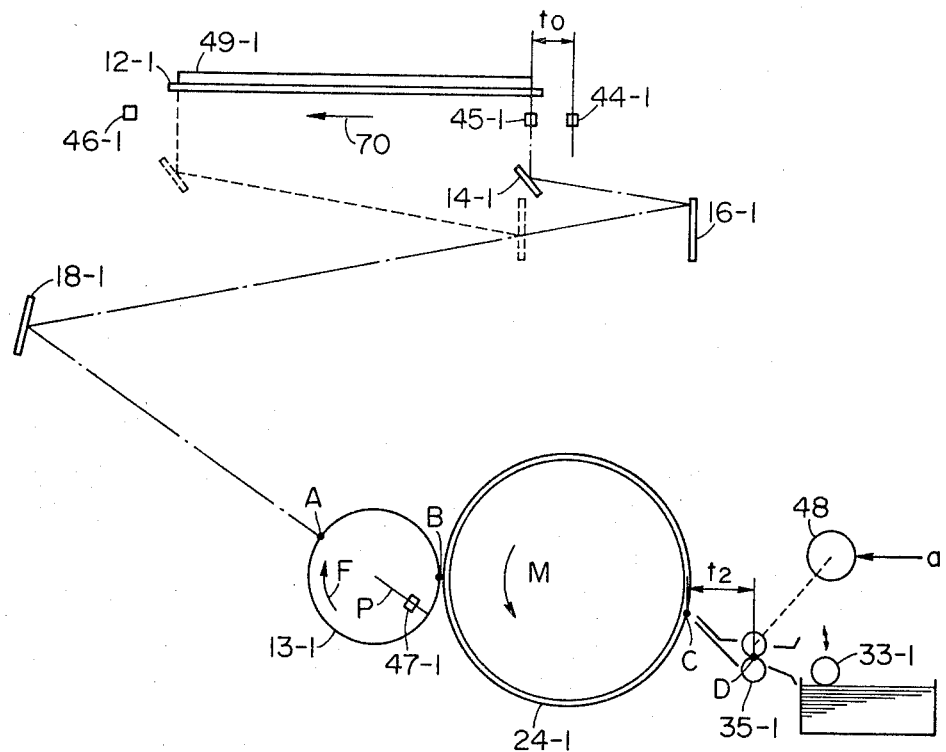
FIG. 3 illustrates the manner of taking the registration timing in a first embodiment.
Figure 5:
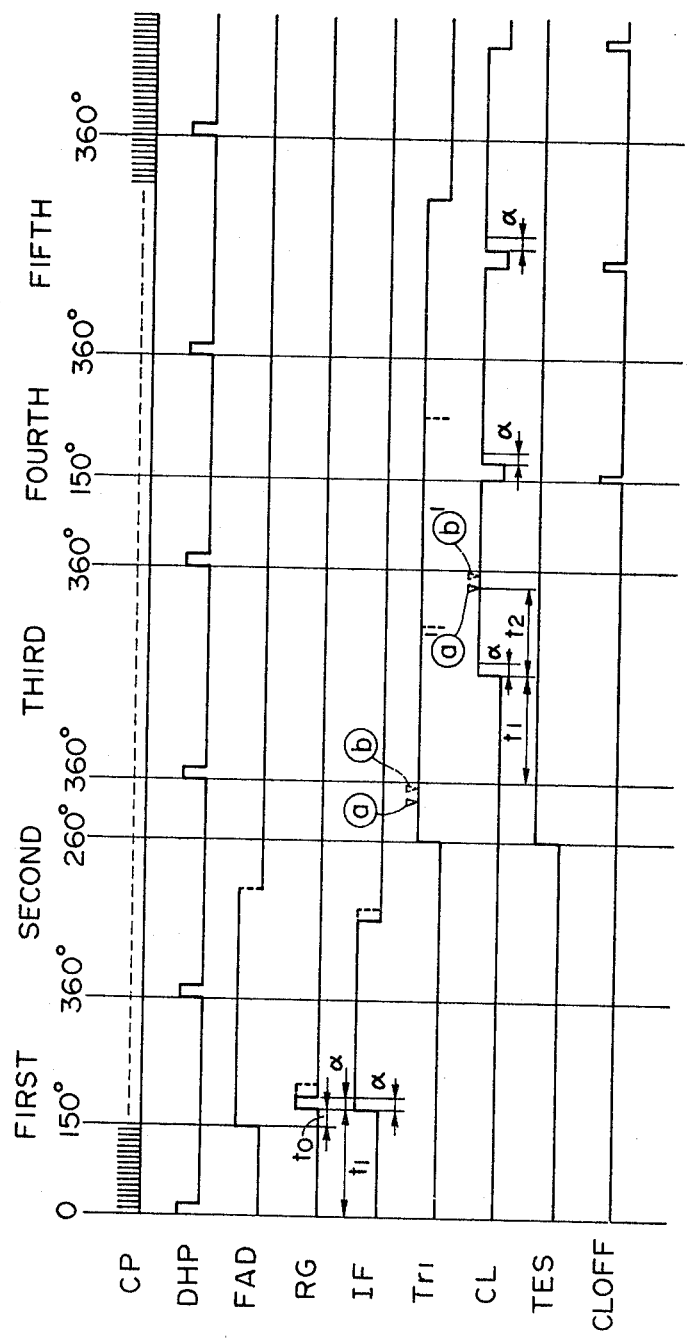
FIG. 5 illustrates the relations between the signals in FIG. 4 and the angles of rotation of the screen drum.

FIGS. 3 to 5 illustrate a first embodiment which has a magnification changing mechanism. FIGS. 6 to 19 illustrate a second embodiment which has a magnification changing mechanism.

The first embodiment will first be described.

FIG. 3 is a schematic view of only the portions necessary for the registration of the copy paper in the image transfer in the apparatus of FIG. 1. It includes an original 49 placed on an original carriage 12-1, a microswitch 44-1 for detecting the rest position (initial position) of a first mirror 14-1 (hereinafter referred to as the optical system), and a microswitch 45-1 for detecting the moved position of the original carriage provided in the path of the original carriage to determine the feed timing of the copy paper and for generating a signal upon passage of a cam provided in the optical system (this position will hereinafter be referred to as the register position). It further includes a microswitch 46-1 for detecting the final position of the forward movement of the optical system (hereinafter referred to as the reversal position), and a microswitch 47-1 for detecting the rest position of a photosensitive drum 13-1 and operable by a cam provided at the standard position P of the photosensitive drum 13-1. Designated by 48 is a clutch for imparting to a register roller 35-1 a rotational drive synchronous with the photosensitive drum 13-1 (hereinafter referred to as the register clutch). Denoted by A is the position whereat the image light is incident on the photosensitive drum. Denoted by 13 is the position whereat a secondary latent image is formed on an insulating drum 24-1 by ion modulation of a primary latent image on the photosensitive drum 13-1. Designated by C is the position whereat the leading end of the dust image on the insulating drum 24-1 contacts the leading end of copy paper 29 to effect image transfer, and denoted by D is the position which is the point of contact between the upper and lower rollers of a register roller set 35-1 and whereat the copy paper 29 temporally stops. Denoted by $t_0$ is the distance (time) over which the optical system moves from its rest position (OHP) 44-1 to the register position 45-1. Denoted by $t_1$ is the time required for the optical system to reach the optical system register position 45-1 after the point p on the photosensitive drum 13-1 has passed through the drum rest position 47-1 (FIG. 5). Denoted by $t_2$ is the distance (time) over which the copy paper moves from the rest position D of the copy paper on the register roller set 35-1 to the contact position C on the insulating drum 24-1.

FIG. 4 is a diagram of the device circuit for the register clutch 48, and FIG. 5 is an operation time chart of the circuit of FIG. 4. In FIG. 4, reference characters 50, 51, 52 and 53 designate usual R-S flip-flop circuits (hereinafter referred to as the FF), each of which is designed to put out level "1" (hereinafter referred to as "1") and level "0" (hereinafter referred to as "0") at Q and $\bar{Q}$, respectively, for a level "1" input to S and thereafter invert the output at Q and $\bar{Q}$ for a "1" input to R. Designated by 60 and 61 are three-digit up-counter circuits, of which the Clock terminals are the input terminals of the pulse to be counted, R are reset terminals, and $Q_1$, $Q_{10}$ and $Q_{100}$ are BCD output terminals of units 1, 10 and 100, respectively, and each has four signal lines. The counter 60 stores the registration time and the counter 61 measures the time until the registration. Designated by 62 is a coincidence detecting circuit for detecting the coincidence between the counters 60 and 61. The coincidence detecting circuit compares digital signals applied to $A_1$, $A_{10}$, $A_{100}$ and $B_1$, $B_{10}$, $B_{100}$ and puts out "1" from its output terminal Out when $A_1=B_1$, $A_{10}=B_{10}$ and $A_{100}=B_{100}$. Designated by 63 is a usual differentiation circuit comprising a resistor and a capacitor for detecting the rising of the signal. Denoted by 64 is an interface (amplification) circuit for converting the output of FF53 into a drive signal for the register clutch.

Designated by DHP in FIGS. 4 and 5 is a drum halt position detecting signal, and CP is a series of clock pulse signals generated in synchronism with the photosensitive drum 13-1 and may be obtained as by detecting a number of apertures provided in a disc 50 directly connected to and rotatable in synchronsim with the rotation of the photosensitive drum 13-1 as shown in FIG. 1, by an optical detector 51. RG is a registered position detecting signal, and TES is a signal indicative of the modulation and this generates a "1" from the beginning of the modulation till the end of the copying by a sequence control circuit, not shown. END is a signal indicative of the end of the copying and is a pulse which generates a "1" at the end of the copying of a predetermined number by a sequence control circuit, not shown. CLOFF is a signal for disengaging the register clutch 48 and is a pulse which is generated when the clock CP is counted by a sequence control circuit, not shown, namely, when the photosensitive drum 13-1 makes a predetermined angle of rotation. FAD is a signal indicative of the forward movement of the optical system and generates a "1" by a sequence control circuit, not shown, when the optical system is moving forward for the formation of a primary image. In the time chart of FIG. 5, α dnotes the variation in the time $t_0$ required for the optical system to move from its rest position 44-1 to its registered position 45-1.

Operation of the circuit will now be described. In the circuit diagram of FIG. 4, FF 50, 51, 52 and 53 are reset by a usual power-up reset circuit (not shown) when the main switch is closed, and their Q outputs put out "0" and their $\bar{Q}$ outputs put out "1". Likewise, the counters 60 and 61 are reset and their outputs all become "0". In this state, when a copy button CPB is depressed to start the copying, the screen-like photosensitive drum 13-1 and the insulating drum 24-1 start to rotate and therewith, a clock pulse CP is generated and applied to one input terminal of each of AND gates 56 and 57. Since, however, the FF 51 and 52 connected to the other input terminals of the respective AND gates are reset and "0" is applied thereto, the outputs both remain at "0". In this state, all the outputs of the counters 60 and 61 are "0" and the A input and the B input of the coincidence circuit 62 are equal to each other and the terminal Out puts out "1". Accordingly, one input of the AND gate 58 assumes "1", while the other input does not set the FF 53 because the modulation signal TES still remains at "0" and consequently, the register clutch 48 is not operated. If the optical system is not in its rest position 44-1 at that time, the optical system is moved in the direction opposite to the direction of the arrow 70 and stopped at its rest position 44-1. During that time, the optical system passes through the registered position 45-1 but, since the optical system forward movement signal FAD applied to one input of the AND gate 54 is "0", the output thereof remains at "0". If the optical system is not in its rest position 44-1 even if the standard position P of the photosensitive drum 13-1 passes through the drum rest position 47-1, one input of the AND gate 59 is "0" so that the output thereof remains at "0". Next, when the optical system is in its rest position 44-1 and the photosensitive drum is rotated until the standard position P reaches the drum rest position, all the inputs of the AND gate 59 assume "1" and the output thereof changes from "0" to "1". Therewith, the FF 51 is set and the output thereof changes from "0" to "1". Thereby, one input of the gate 56 assumes "1" and the output thereof puts out a signal by the clock pulse CP. Consequently, the counter 60 to which is connected the output of the gate 56 starts to count the clock pulse CP. As soon as the standard position P of the photosensitive drum passes through the rest position, the sequence control circuit CT (FIG. 4(a)) starts to count the clock pulse CP and starts ON-OFF-control of processing means in a pre-programmed sequence. The photosensitive drum 13-1 continues to rotate and when the standard position P thereof has rotated through 150° from the drum rest position, the optical system forward movement clutch is engaged by the control circuit CT, whereupon the optical system starts to move forward from its rest position 44-1. When the optical system reaches the registered position 45-1 in the time to from 150°, both inputs of the gate 54 assume "1" and the output thereof changes from "0" to "1" for the first time, to thereby invert the FF circuit 51 to its reset condition. Along therewith, one input of the gate 56 to which is connected the Q output of the FF 51 becomes "0" so that the gate 56 does not put out any output thereafter irrespective of the clock pulse CP applied to the other input of the gate. At the same time, another FF 50 is inverted to its set condition and a gate 59 to which is connected the $\overline{Q}$ output of the FF 50 is closed and the FF circuit 51 is not set until the FF circuit 50 is reset by the copy end signal END, namely, unless the $\overline{Q}$ output assumes "1". That is, the count of the clock pulse started from the passage of the drum rest position 47-1 is stopped upon passage of the optical system through the registered position 45-1, and the counter 60 stores the so far counted value until the reset signal is applied to the R terminal, and puts out outputs from the output terminals $Q_1$, $Q_{10}$ and $Q_{100}$ in the meantime. Namely, the time whereat the leading end of the image light is incident on the photosensitive drum 13-1 is stored by a count value indicative of the rotational angle after the standard position of the photosensitive drum 13-1 has passed through the drum rest position 47-1.

The photosensitive drum 13-1 further continues to rotate and a primary electrostatic latent image of the original image is completely formed on the surface thereof and at a point B in FIG. 3, a modulation image starts to be formed by the electrostatic latent image on the insulating drum 24-1, namely, in the time chart of FIG. 5, the photosensitive drum reaches 260° during its second rotation, whereupon the modulation signal TES changes from "0" to "1" and "1" is applied to one input terminal of a gate 55. The photosensitive drum 13-1 continues to rotate and when the standard position P thereof reaches the position ⓐ on the time chart of FIG. 5, modulation is started from the leading and of the latent image. When a third drum halt position signal DHP is applied to one input of the gate 55, the output thereof generates a DHP signal because the other input terminal has already assumed "1". By this, the FF circuit 52 is set and a gate 57 to which the output terminal Q is connected starts to put out the clock pulse CP. That is, the counter 61 to which is connected the output of the gate 57 starts to count the clock pulse. In accordance with the clock pulse number so counted, three-digit BCD signal is put out and applied to the B input terminal of the coincidence circuit 62. When the counter 61 has counted the clock pulse number equal to the stored value of the counter 60, the signal at the output terminal Out of the digital signal coincidence circuit 62 changes from "0" to "1" and is applied to one input of the gate 58. Since the modulation signal connected to another input of the gate 58 is "1" at this time, the FF circuit 53 is set. Thereby, the Q output of the FF circuit 53 changes from "0" to "1" and engages the register clutch 48 through an output circuit 64.

The variation in the Q output is applied as a differentiation signal to the R terminal of the FF circuit 52 through the differentiation circuit 63 to reset the FF circuit 52. This signal is also applied to the R terminal of the counter 61 to reset the counter 61 and render all the outputs thereof $Q_1$, $Q_{10}$ and $Q_{100}$ to "0". That is, after a clock pulse number equal to the aforementioned time $t_1$ has been counted from the time when the standard position P of the photosensitive drum has passed through the drum rest position in the third rotation on the time chart of FIG. 5, the register clutch 48 is operated while, at the same time, the count of the clock pulse is interrupted and the counter 61 is reset.

By this, the copy paper 29 conveyed by a feed roller 33-1 driven by the sequence control circuit CT and stopped at the point D of the register roller set 35-1 to form a loop between the feed roller 33-1 and the register roller 35-1 is fed with the rotation of the register roller 35-1. After the photosensitive drum 13-1 has been further rotated for the time $t_2$, the copy paper contacts the insulating drum 24-1 at the point C and has its leading end coincident with the toner image on the insulating drum (at the point ⓐ in FIG. 5). The photosensitive drum 13-1 further continues to rotate and when the point P passes through the drum rest position for the fourth time, the FF circuit 52 is again set so that the counter 61 starts to count the clock pulse CP. When the counter 61 has counted the clock which reaches 150° in the fourth rotation, a register clutch off signal CLOFF is generated by the sequence control circuit CT and applied to the R terminal of the FF circuit 53, which is thus reset. By this, the register clutch 48-1 is disengaged to terminate the feeding of a first copy paper sheet. At this point of time, the copy paper is completely spaced apart from the register roller. The photosensitive drum 13-1 is further rotated and when the stored value of the counter 60 and the output of the counter 61 become coincident with each other, the register clutch 48 is again engaged to register a second sheet of copy paper. When a predetermined number of copies have been produced by repeating such operation, the modulation signal TES changes from "1" to "0" and further, a copy end signal END is generated by the sequence control circuit CT and applied to the FF circuit 50 and the R terminal of the counter 60 to reset both of them, thus terminating all the operation and becoming ready for another cycle of copying.

If the time required for the optical system to move from its rest position to its registered position 45-1 during the exposure scanning is not $t_0$ but varied to $t_0+\alpha$, the time $t_1$ required for the optical system to reach its registered position 45-1 after the standard position P of the photosensitive drum 13-1 has passed through the drum rest position 47-1 is also varied to $t_1+\alpha$. Accordingly, the clock pulse number stored in the counter circuit 60 also changes to a number corresponding to $t_1+\alpha$. Consequently, even if the timing for engaging the register clutch 48-1 next time takes place after the counting of a clock pulse number corresponding to $t_1 + \alpha$ after the passage of the drum rest position and the starting for exposure of the optical system and the original carriage is delayed to change the position of the leading end of the original image on the drum, the register clutch 48 operates to correct the same and ensure the leading end of the copy paper to be coincident with the leading end of the original image. It is also possible to deviate the position of the microswitch 45-1 or somewhat adjust the value of the counter 60 to thereby position the leading end of the image deviated by a predetermined position from the leading end of the paper.

Reference is now had to FIGS. 6 to 9 to describe a second embodiment of the present invention.

FIG. 6 is a schematic view of only the portions necessary for the registering of copy paper in the image transfer effected in the apparatus of FIG. 1. There is seen an original 49-2 supported on an original carriage 12-2, and a Hall IC 44-2 for detecting the rest position (hereinafter referred to as the home position) of a first mirror 14-2 (hereinafter referred to as the optical system) and for generating an optical system home position signal OHP by a magnet provided in the optical system. There is further seen a Hall IC 45-2 for detecting the original carriage moved position provided in the path of the original carriage to determine the feed timing of copy paper 29 (such position will hereinafter be referred to as the optical system registered position) and for putting out an optical system registered position signal ORGP upon the passage of the magnet provided in the optical system. Designated by 46-2 is a Hall IC for detecting the final position of forward movement of the optical system (hereinafter referred to as the reversal position) and for putting out an optical system reversal position signal OBP. Denoted by 47-2 is a Hall IC for detecting the home position of the screen drum 13-2 (hereinafter referred to as the drum home position) and operable by a magnet provided at the standard position P on the screen drum 13-2. Reference numeral 50 designates a clock plate provided with a slit 50'. The clock plate 50 generates a clock pulse CP by a photointerrupter 51 comprising a light-emitting diode and a phototransistor. The clock pulse CP is such that a pulse is generated for 1° rotation of the screen drum.

CL4 is a clutch for imparting a rotative drive synchronous with the screen drum 13-2 to a register roller 35-2 (hereinafter referred to as the register clutch), CL3A a lower stage paper feed clutch for imparting a drive force to the paper feed roller 33-2 of the lower cassette 32, and CL3B an upper stage paper feed clutch for imparting a drive force to the paper feed roller 43-2 of the upper cassette 42. Points A, B, C and D are like those in the first embodiment. That is, the point A is an exposure position whereat the image light from the original 49-2 is incident on the screen drum 13-2, the point B is a modulation position whereat ion modulation is effected by the primary latent image on the screen drum 13-2 to form a secondary latent image on the insulating drum 24-2, the point C is an image transfer position whereat the leading end of the dust image on the insulating drum 24-2 contacts the leading end of the copy paper 29, and the point D is the point of contact between the upper and lower rollers of the register roller set 35-2 and shows a stop position whereat the copy paper is temporally stopped.

$T_0$, $T_1$, $T_2$, $T_3$ and $T_4$ correspond to the clock pulse numbers put out during the movement of the copy paper or the optical system. The clock pulse number does not actually correspond to time at one-to-one ratio because the rotational velocity of the screen drum 13-2 is varied, but it is herein described as time. $T_0$ is the time (distance) over which the optical system is moved from its home position 44-2 to its registered position 45-2, and $T_0$ differs from one-to-one magnification to reduction (1) and reduction (2), as shown by $T_{01}$, $T_{02}$ and $T_{03}$. $T_1$ is the time (distance) required for the optical system to reach the Hall IC 45-2 at the optical system registered position after the P on the screen drum 13-2 has passed through the home position 47-2, and $T_1$ differs from one-to-one magnification to reduction (1) and reduction (2), as shown by $T_{11}$, $T_{12}$ and $T_{13}$. $T_2$ is the time (distance) over which the copy paper moves from the stop position D on the register roller 35-2 to the image transfer position C on the insulating drum 24-2. $T_4$ is the time (distance) required from when the lower paper feed roller 33-2 begins rotating until the copy paper 29 at least reaches the stop position D. $T_3$ is the time (distance) required from when the upper paper feed roller 43-2 begins rotating until the copy paper 29 at least reaches the stop position D. $T_3$ and $T_4$ differ from each other because the length of the paper path differs from the lower to the upper stage. Times $T_3$ and $T_4$ are set to longer values than the time required for the copy paper to move between the paper feed rollers and the register roller set such that the copy paper 29 forms a loop between the paper feed rollers 33-2, 43-2 and the register rollers 35-2.

As shown in FIGS. 6 and 7, the position of the lens system 17-2 and the initial position of the second mirror 16-2 differ in accordance with one-to-one magnification, reduction (1) and reduction (2). The positions of the lens system 17 are designated at 17a, 17b and 17c, and the initial positions of the second mirror 16 are designated at 16a, 16b and 16c. The initial position of the first mirror 14-2 is invariable. Accordingly, the positions of the first mirror 14-2 and the second mirror 16-2 at the point of time whereat the bus line of the reflected light from the leading end of the original 49-2 is coincident with the bus line 8 of the light path differ from one-to-one magnification to reduction (1) and reduction (2). Therefore, in the case of one-to-one magnification, the bus line of the reflected light from the leading end of the original 49-2 is coincident with the bus line of the light path when the first mirror 14-2 is detected by the Hall IC 45-2 (when the first mirror 14-2 is at the position 14a of FIG. 7), but in the case of reduction (1), ORGP signal is detected in a time $\beta_1$ after the bus line of the reflected light is coincident with the bus line of the light path (the first mirror 14-2 is at the position 14b of FIG. 7); and in the case of reduction (2), signal ORGP is detected in a time $\beta_2$ after the first mirror 14-2 is at the position 14c of FIG. 7. Thus, the relation among $T_{11}$, $T_{12}$ and $T_{13}$ may be expressed as follows:

$$T_{11} + \beta_1 = T_{12}, \quad T_{13} = T_{11} + \beta_2$$

Here, assuming that the register rollers 35-2 are driven uniformly with a predetermined time delay for the registered position signal ORGP, the leading end of the image on the insulating drum and the leading end of the copy paper 29 do not come into coincidence with each other during one-to-one magnification, reduction (1) and reduction (2). The second embodiment eliminates such irrationality and is designed such that the position of the Hall IC 45-2 for detecting the registered position is not displaced depending on the magnification.

That is, in this second embodiment, the time $T_1$ is measured and stored in a RAM which will later be described, so that the times $\beta_1$ and $\beta_2$ corresponding to the copying magnifications are subtracted from the time $T_1$ stored to determine the timing for driving the paper feed rollers 33-2 and 34-2.

Figure 8B:
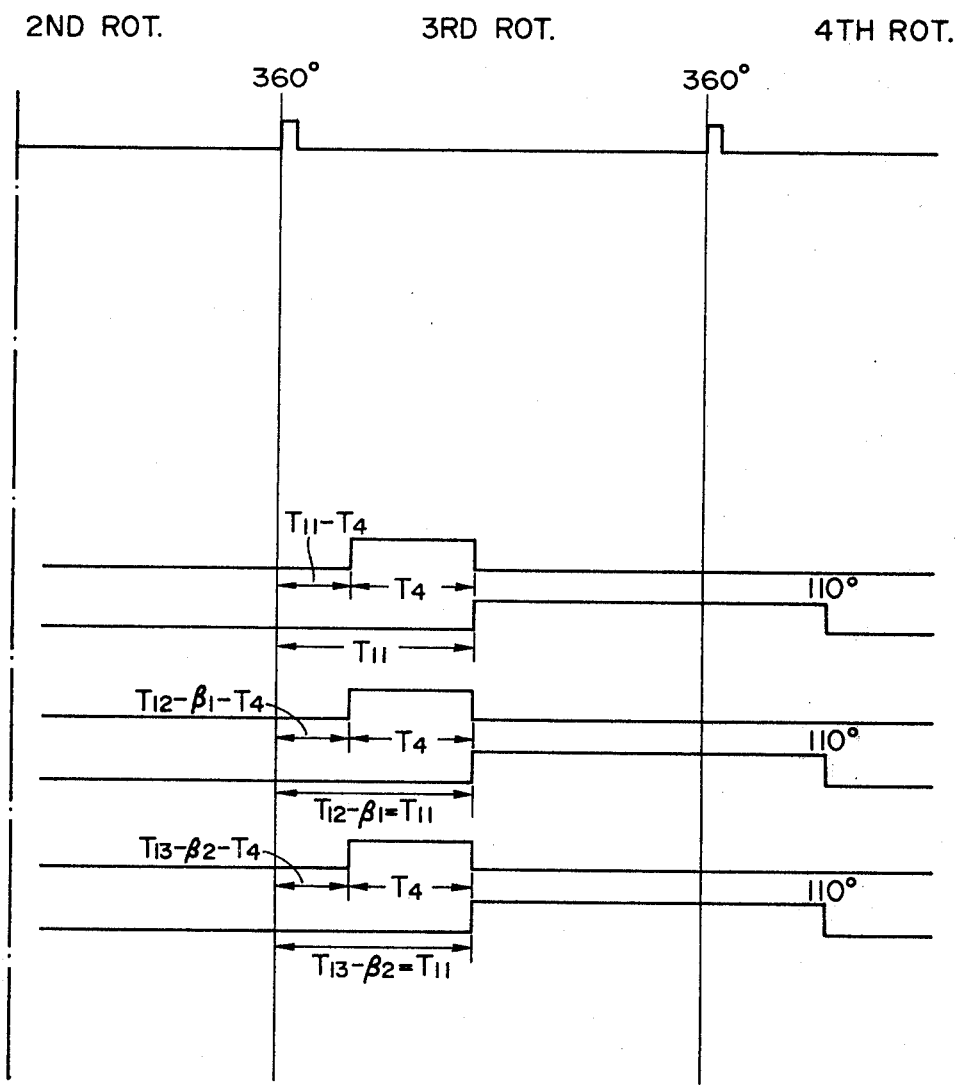

More specifically, as shown in the time chart of FIG. 8, the screen drum 13-2 determines the timing for driving the paper feed clutch CL3 and the register clutch CL4, on the basis of the drum home position signal DHP in the third rotation. In the case of one-to-one magnification, the lower paper feed clutch CL3 is driven when a time obtained by subtracting the time $T_4$ from the time $T_{11}$ has elapsed from the DHP in the third rotation, and the paper feed clutch CL3 is disengaged and the register clutch CL4 is driven when the time $T_{11}$ has elapsed from the DHP in the third rotation. In the case of reduction (1), the lower paper feed clutch CL3A is driven after a time obtained by subtracting the time $T_4$ and the correction time $\beta_1$ from the time $T_{12}$ with the DHP in the third rotation as the standard has elapsed, and the paper feed clutch CL3 is disengaged and the register clutch CL4 is driven when a time obtained by subtracting the correction time $\beta_1$ from the time $T_{12}$ with the DHP in the third rotation as the standard has elapsed. Likewise, in the case of reduction (2), the drive control of the clutches is effected with the timing obtained by subtracting the correction time $\beta_2$. Where a plurality of copies are to be produced, this is repeated. Description has been made with respect to the case where the lower cassette is used, but where the upper cassette is used, the time for driving the paper feed clutch is $T_3$.

As described above, the time for operating the feed means such as paper feed clutch, register clutch, etc. is preset in accordance with the copying magnification and the set time is stored to repetitively operate the feed means and therefore, it is possible to coincide the leading end of the image with the leading end of the transfer paper without moving a specific position detecting means which puts out a registered position signal in accordance with the magnification and moreover, it is possible to control the image transfer independently of the exposure scanning. Furthermore, stable control is possible even when the length of the paper feed path differs depending on the difference in the paper feed station used.

Also, the interval between the timing for starting to drive the paper feed roller and the timing for starting to drive the register rollers is always constant when the same paper feed station is used, so the amount of loop between the paper feed roller and the register rollers is always constant. This eliminates the inconvenience that when the starting of the drive of the paper feed roller is too late, the register rollers are rotated before the copy paper reaches the register rollers and thus, the leading end of the image is not coincident with the leading end of the copy paper.

Further, by shifting the position of the microswitch 45-2 or setting the correction time irrespective of one-to-one magnification or varied magnification, it will be possible to position the leading end of the image at a predetermined location deviated from the leading end of the copy paper.

Now, description will be made with reference to the flow charts of FIGS. 9-11 and the timing chart of FIG. 12.

STEP 1

When the copy start button is depressed, the main motor M1, fixing device motor M4, dust image transfer high voltage transformer HVT7 and insulating drum discharging transformer HVT8 are energized.

STEP 2

Whether or not the optical system home position signal OHP is being put out is checked and when such OHP is not being put out, the optical system backward moving clutch CL2 is engaged to return the optical system to its home position.

STEP 3

Whether or not the drum home position signal DHP is being put out is checked. When the DHP is put out, step 4 is entered.

STEP 4

Figure 14A:
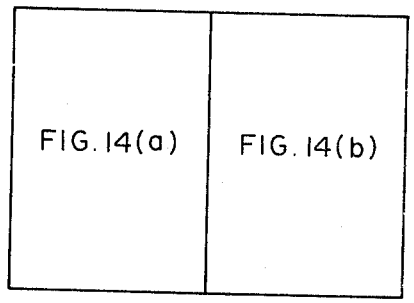

The address of ROM designated by label TL1 is stored in a working register WA(0) in RAM (FIG. 14). That is, the address of ROM in which the count number CPX of the drum clock pulse CP effected in a later-described subroutine SUBCP is stored is contained in WA107. Further, register flag FLAGRG1 is set, the previous register counter RGCNT 1 is cleared, and further the primary charging high voltage transformer HVT 1 is energized.

STEP 5

After 110 clock pulses CP is counted in a later-described subroutine SUBCP, the secondary discharging high voltage transformer HVT 3, the image exposure lamp L1 and the whole surface exposure lamp L3 are energized.

STEP 6, STEP 7, STEP 8

Whether the copying magnification is one-to-one magnification, reduction (1) or reduction (2) is judged and a corresponding clutch CL1A, CL1B or CL1C is driven with a predetermined timing.

STEP 9

When the screen drum has made one full rotation and again puts out the drum home position signal, the primary charging high voltage transformer HVT1 is deenergized.

STEP 10

When the screen drum reaches 115° in the second rotation in the subroutine SUBCP, the secondary discharging high voltage transformer HVT3 and the image exposure lamp L1 are deenergized. This completes the formation of a primary latent image on the screen drum 13-2.

STEP 11

When the screen drum 13-2 reaches 132° in the second rotation, the main motor M1 is changed over to a high speed M1H and the optical system backward moving clutch CL2 is engaged. The main motor is rotated at a speed three times that during the primary latent image formation. Therefore, the clock pulses CP are put out at a speed three times. A pulse CP is put out for 1° rotation of the screen drum.

STEP 12

When the screen drum 13-2 reaches 165° in the second rotation, the whole surface exposure lamp L3 is turned off.

STEP 13

When the screen drum 13-2 reaches 200° in the second rotation, the developing device motor M2 is energized.

STEP 14

When the screen drum 13-2 reaches 250° in the second rotation, the latent image transfer high voltage transformer HVT6 is energized.

STEP 15

Correction of the timing for driving the paper feed clutch and the register clutch in accordance with the copying magnification is effected.

STEP 16

Whether the paper feed cassette in use is upper or lower is discriminated, and the paper feed counter and the register counter are set in accordance with the upper or the lower stage.

STEP 17

Whether or not the screen drum 13-2 has reached the DHP in the third rotation is discriminated and when it has reached the third rotation, whether there is a stop instruction and whether paper is present in the selected paper feeding station is discriminated. If there is a stop instruction or no paper is present in the selected paper feeding station, the step progresses to (F) and enters a stop routine. If there is no abnormality, the step goes to STEP 18.

STEP 18

The data of the paper feed counter in the RAM and the data of the register counter are transferred to another address, and the paper feed flag FLAGPF and the register flag (2) FLAGRG 2 are set. Further, the address of ROM designated by label TL3 is stored in the working register WA(0) in the RAM.

STEP 19

When the screen drum 13-2 reaches 110° in the third rotation, the register clutch CL4 is disengaged.

STEP 20, STEP 21

When the screen drum 13-2 reaches 120° in the third rotation, the brake clutch CL5 is engaged and when the drum reaches 150°, the brake clutch CL5 is disengaged.

STEP 22

Whether or not the number of copies completed is equal to the set number is judged and when the number of copies completed has not yet reached the set number, the step goes back to STEP 17 to continue copying, and when the number of copies completed is equal to the set number, the step progresses to STEP 23 and subsequent stop routines.

STEP 23

After the set number of copies has been completed, the drum home position signal DHP is detected. For convenience, this DHP is defined as the DHP in the fourth rotation, but if the actual set number of copies is M, this DHP is one in the (M+3)th rotation.

STEP 24

The address of ROM designated by label TL4 is stored in the working register WA(0) in the RAM.

STEP 25-STEP 32

After the screen drum 13-2 has entered the fourth rotation and reached 110°, the developing device motor M2 and the register clutch CL4 are deenergized (STEP 25), and when the screen drum has reached 120°, the brake clutch CL5 is engaged and the register rollers are stopped (STEP 26), and when the screen drum has reached 150°, the brake clutch CL5 is disengaged (STEP 27), and when the screen drum has reached 260°, the latent image transfer high voltage transformer HVT6 is deenergized (STEP 28). Further, at STEPS 29 and 30, and DHPs in the fifth and the sixth rotation are detected and when the screen drum has reached 210° in the sixth rotation, the main motor is changed over from high speed to low speed (STEP 31), and when the drum has reached 260°, the main motor M1, dust image transfer high voltage transformer HVT7, insulating drum discharging high voltage transformer HVT8 and fixing device motor M4 are deenergized. This completes the main routine and the apparatus waits for a copy start signal to be again put out.

Figure 9:
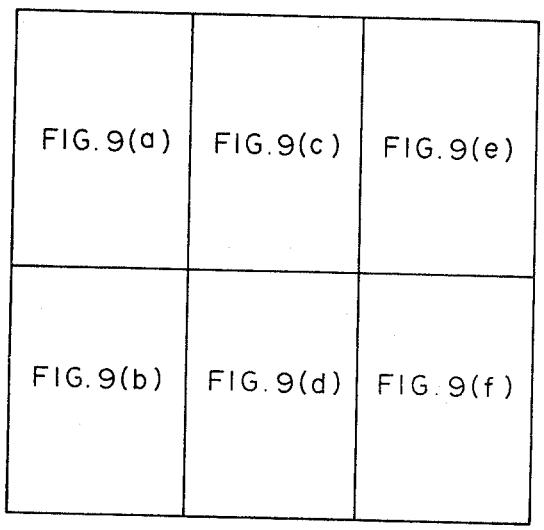
FIGS. 9, 9a-9f, 10, 10a-10c, 11, 11a-11d are control flow charts of the second embodiment.
Figure 10:
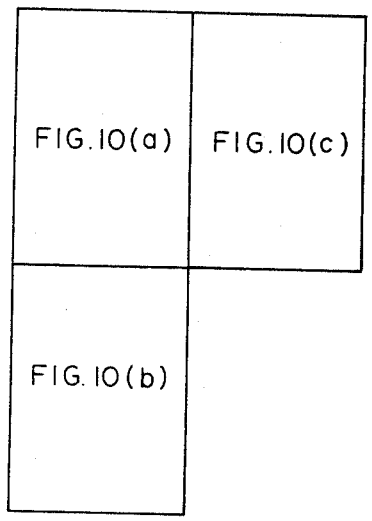
Figure 15:
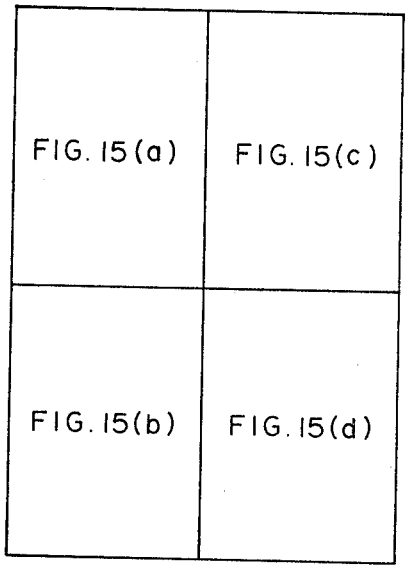
FIGS. 15, 15a–15d, 16, 16a–16d, 17, 17a–17d, 18, 18a–18d are flow charts showing the flow charts of FIGS. 9 to 11 in greater detail.
Figure 16:
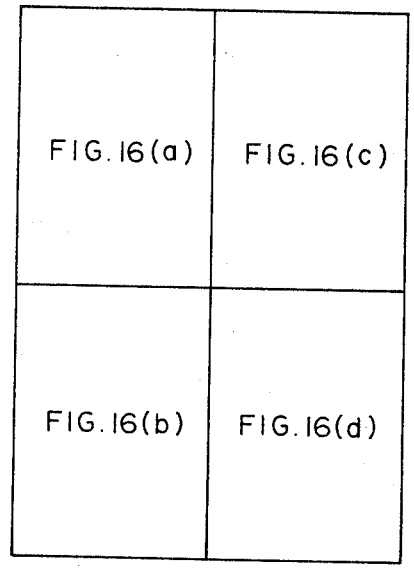
Figure 17:
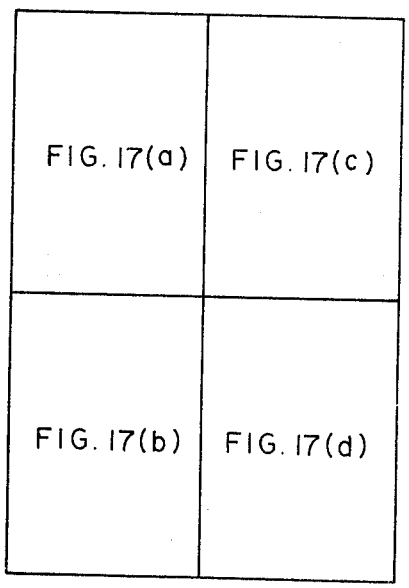

FIGS. 15-17 are micro-flow charts which show in greater detail the flow charts of FIGS. 9-10.

Description will now be made of the subroutine SUBCP of FIG. 11.

STEP-S1

The data of ROM designated by the working register WA(0) in RAM is set to the clock pulse counter CPX in RAM. That is, the clock pulse number to be counted in the first subroutine SUBCP is stored in CPX.

STEP-S2

Whether or not the clock pulse CD is "1" is detected and, when it is "1", the clock pulse flag FLAGCP of RAM is set.

STEP-S3

Whether or not the optical system home position signal OHP is being put out is judged and, when the OHP is being put out, the optical system backward moving clutch CL2 is disengaged.

STEP-S4

Whether or not the optical system back position signal OBP is being put out is judged, and the optical system forward moving clutches CL1A, CL1B and CL1C for one-to-one magnification, reduction (1) and reduction (2), respectively, are disengaged.

STEP-S5

Whether or not the optical system registered position signal ORGP is being put out is judged. When ORGP is being put out, the register flag (1) FLAGRG1 set at STEP 4 of the main routine is reset.

STEP-S6

Whether or not the clock pulse flag FLAGCP has been set is judged and when it has been set, the step progresses to STEP-S7 and when it has not been set, the step goes back to STEP - S2.

STEP-S7

Whether or not the clock pulse CP is "0" is judged and if it is "1", the step goes back to STEP-S2 and if the CP falls to become "0", the numerical value (CPX) in the clock pulse counter CPX is subjected to -1 and entered into the CPX to reset the flag FLAGCP. That is, at STEPS-S2, S6 and S7, the falling of the CP is detected (CPX) and -1 is effected.

STEP-S8

Whether or not the register flag (1) FLAGRG1 has been set during the fall of the CP is judged. It if has been set, the register counter (1) is subjected to +1. The register flag (1) FLAGRG1 is set for the time $T_1$ and counts the count number during that time to the register counter (1) RG-CNT1, namely, counts the time $T_1$ and stores the same.

STEP-S9

Whether or not the paper feed flag FLAGPF for effecting the setting at STEP 18 of the main routine is set is judged and if it is set, the step progresses to STEP-S11 and effects −1 on the numerical value (PF-CNT1) of the paper feed counter (1) PF-CNT1 in the RAM. Thereafter, whether or not (PF-CNT1) is 0 is judged and if it is 0, the step progresses to STEP-S13, and if it is not 0, the step progresses to STEP-S10.

STEP-S10

Whether the paper feeding station in use is the lower or the upper one is judged and, if it is the lower one, the lower paper feed clutch CL3A is engaged and if it is the upper one, the upper paper feed clutch CL3B is engaged, whereafter the paper feed flag FLAGPF is reset and the step progresses to STEP-S13. That is, in STEPS-S9 and S10, the time $(T_1-T_4)$ or $(T_1-T_3)$ from the DHP in the third rotation of the screen drum 13-2 till the paper feed determined in the main routine STEP 16 is counted and the paper feed clutch is engaged.

STEP-S11

Whether or not the register flag (2) FLAGRG 2 is set is judged and if it is not set, the step advances to STEP-S13 and if it is set, −1 is effected on the numerical value (RG-CNT1) of the register counter (1) RG-CNT1 in RAM.

STEP-S12

Whether or not (RG-CNT1) is 0 is judged and if it is 0, the upper and lower paper feed clutches CL3A and B are disengaged and the register clutch CL4 is engaged and the register flag (2) FLAGR (2) is reset. That is, the time from when the paper feed clutch has been engaged at STEPS-S11 and S12 until the register clutch is driven (if the upper feeding station is used, $T_3$ and if the lower feeding station is used, $T_4$) is counted and the register clutch is driven.

STEP-S13

Whether or not the clock pulse counter CPX set in STEP-S1 has become 0 is judged and if it has not become 0, the count of the clock pulse is continued and if it has become 0, the address of ROM stored n WA(0) is incremented.

Figure 18:
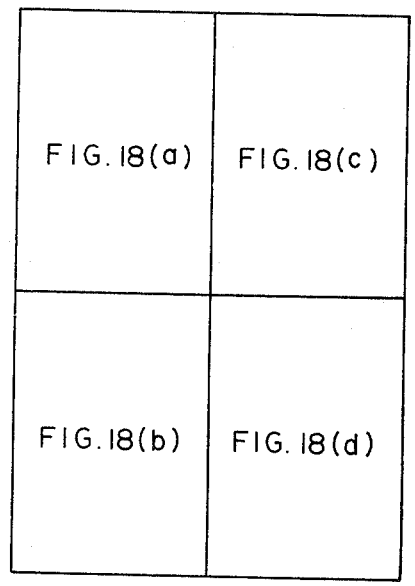
Figure 15A:
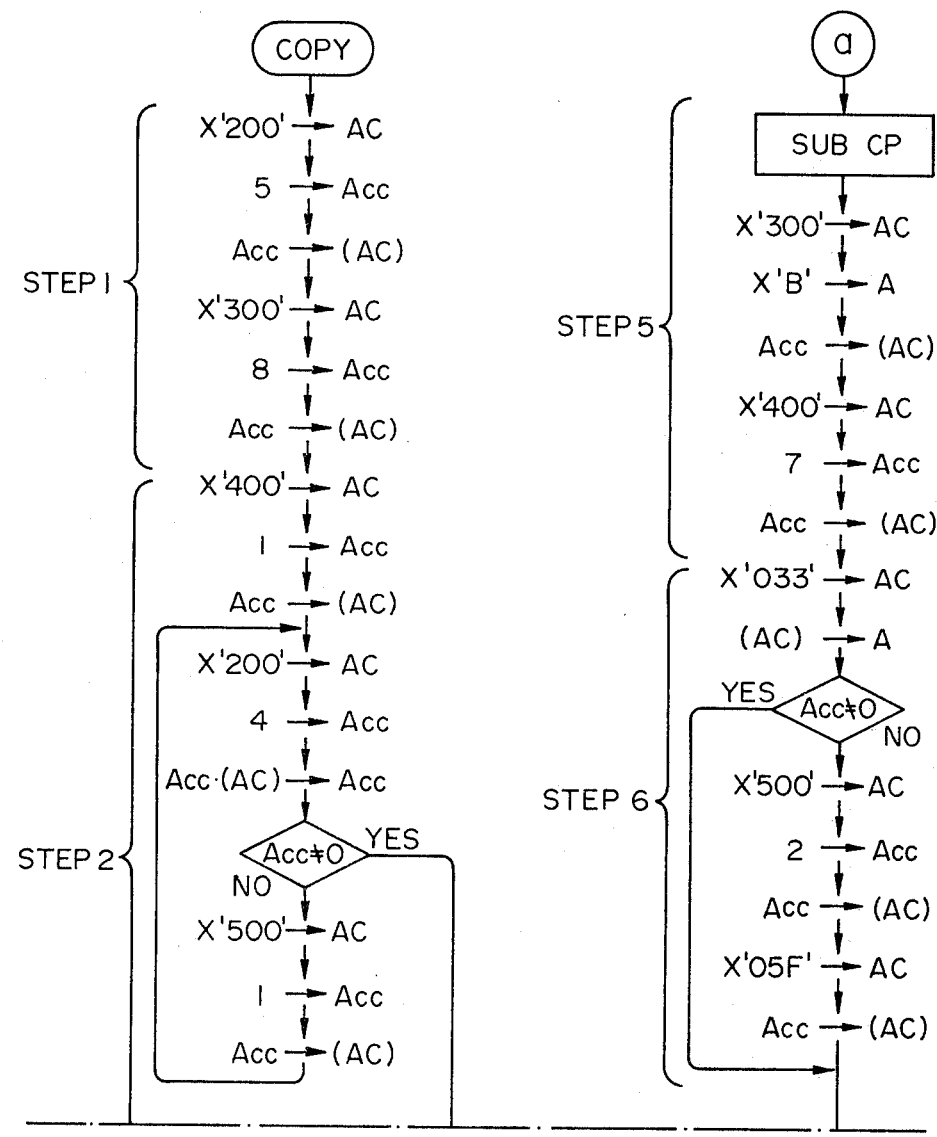
Figure 15B:
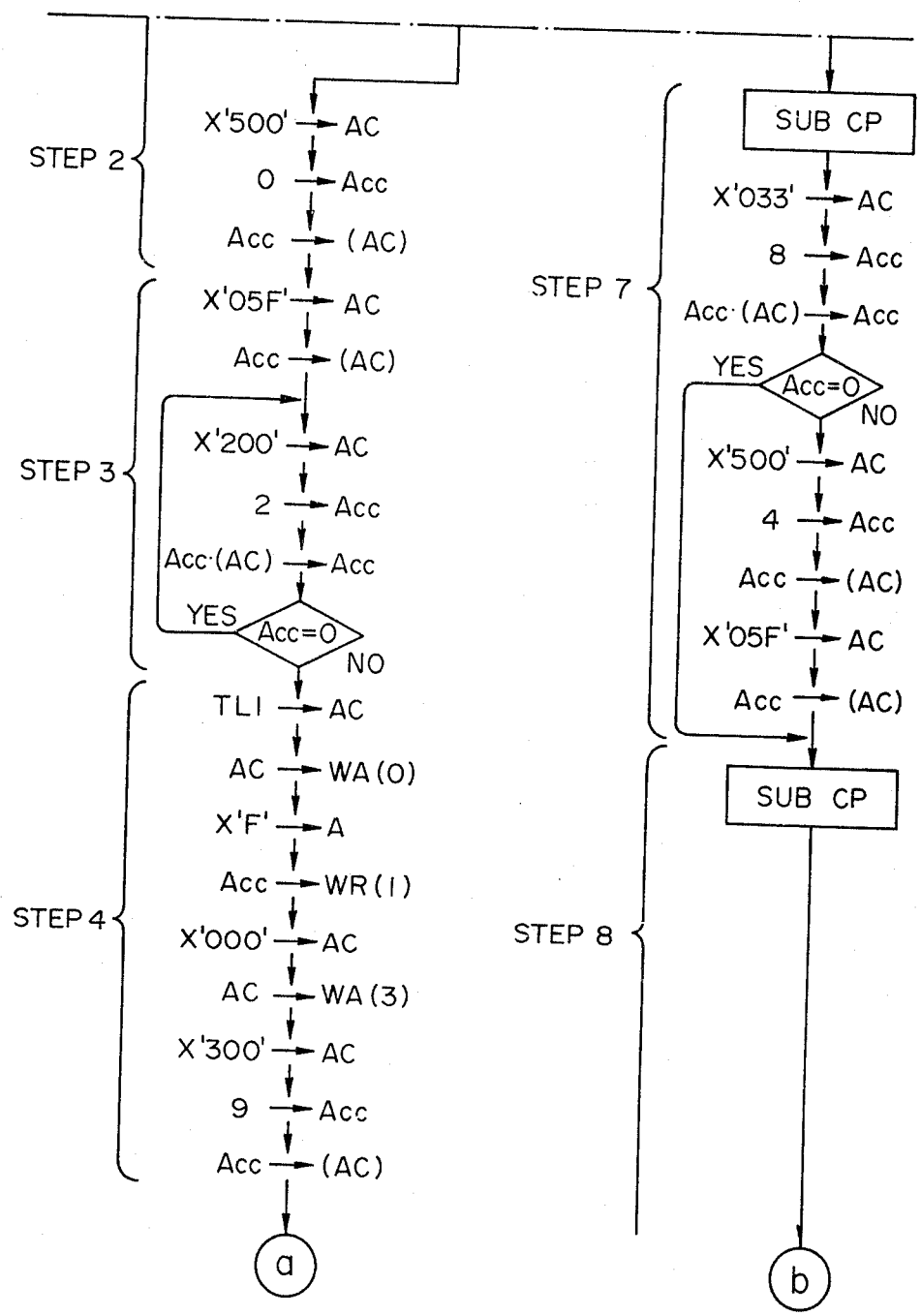
Figure 15C:
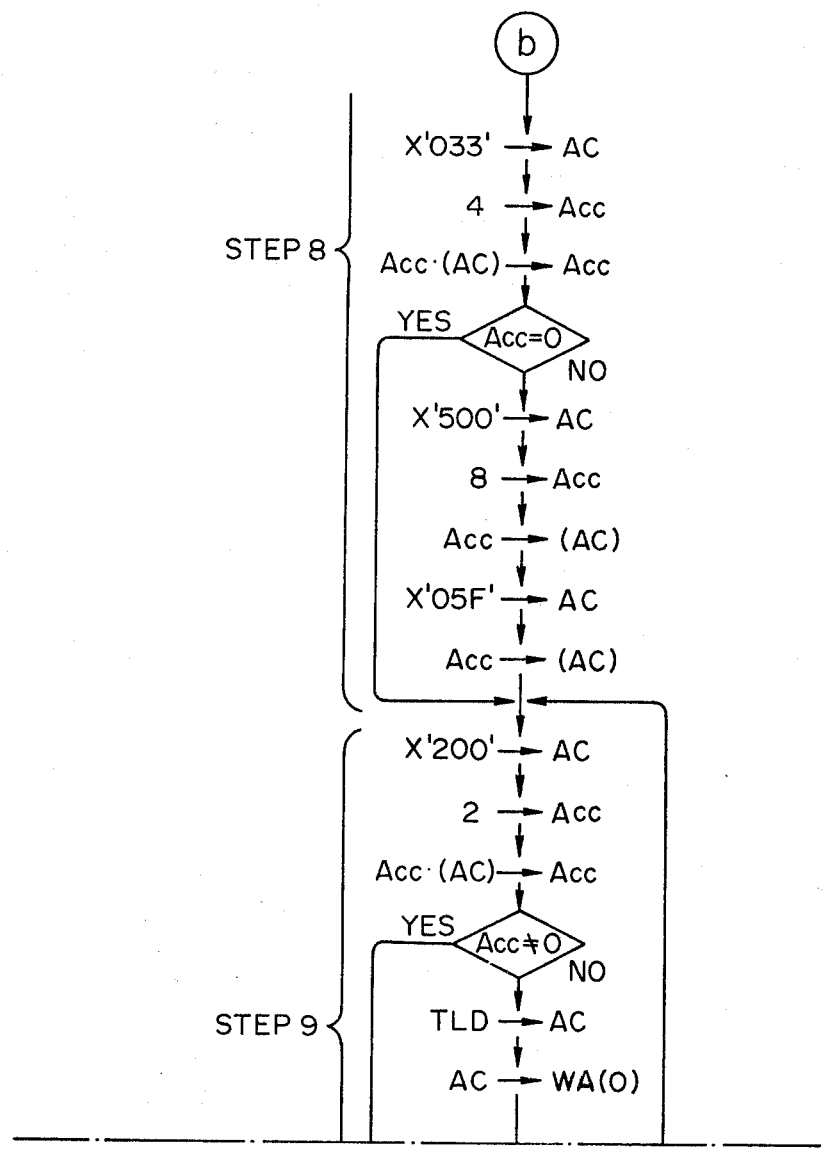
Figure 15D:
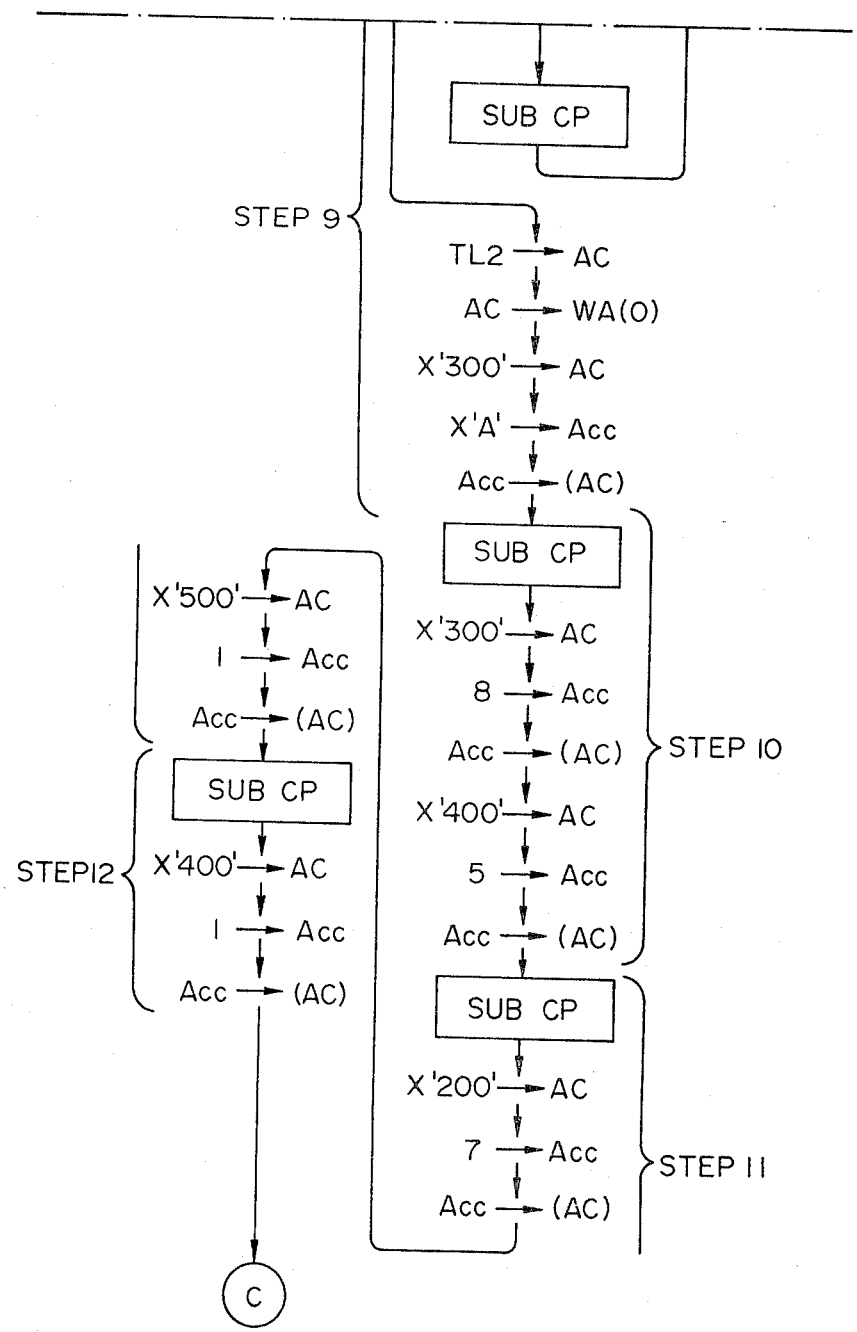
Figure 16A:
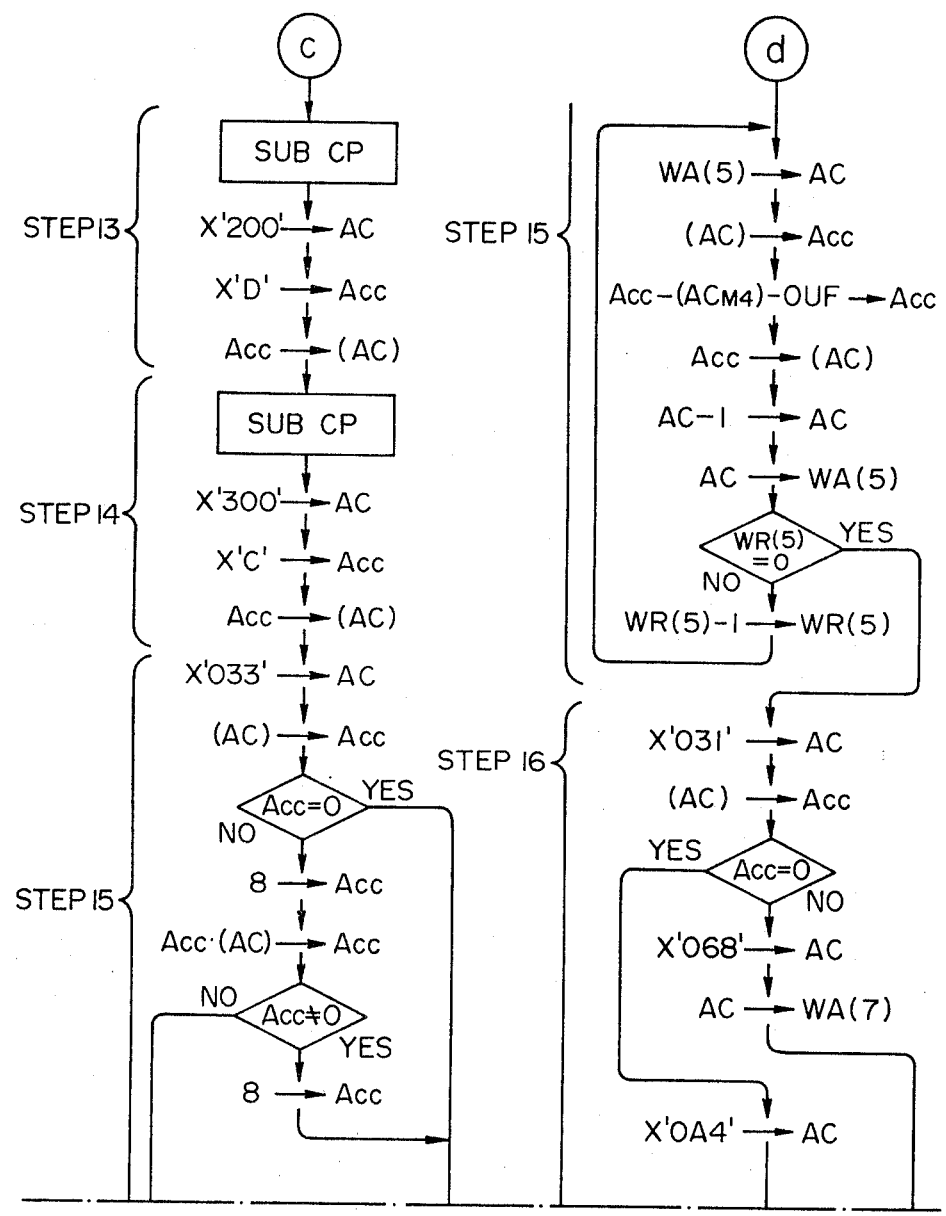
Figure 16B:
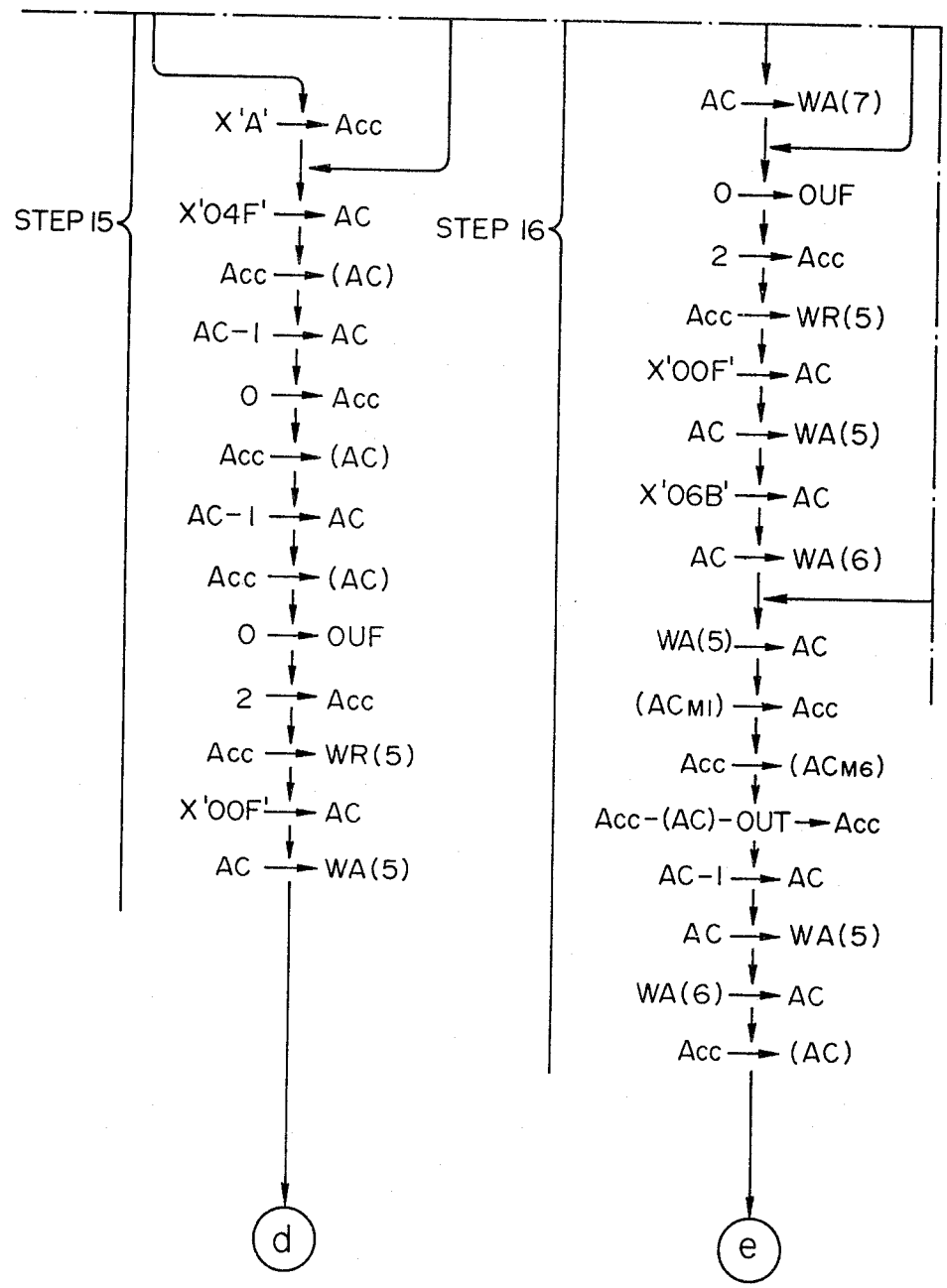
Figure 16C:
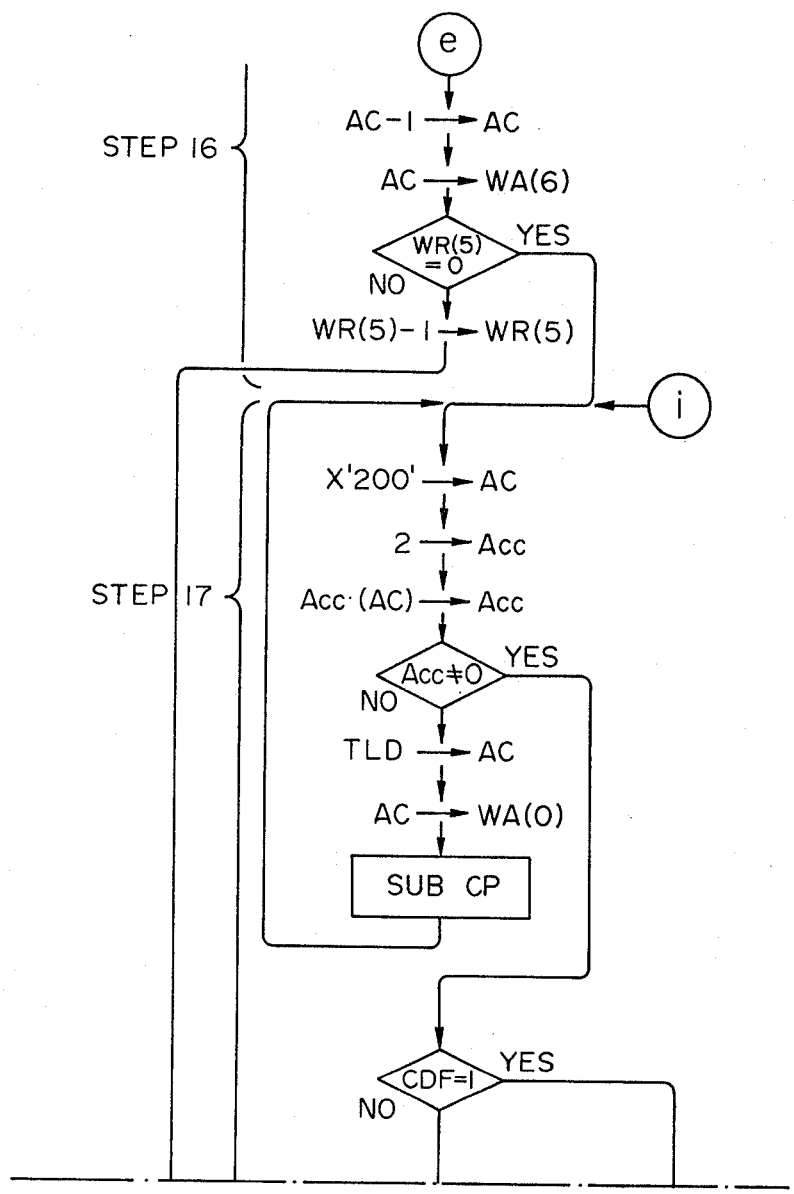
Figure 16D:
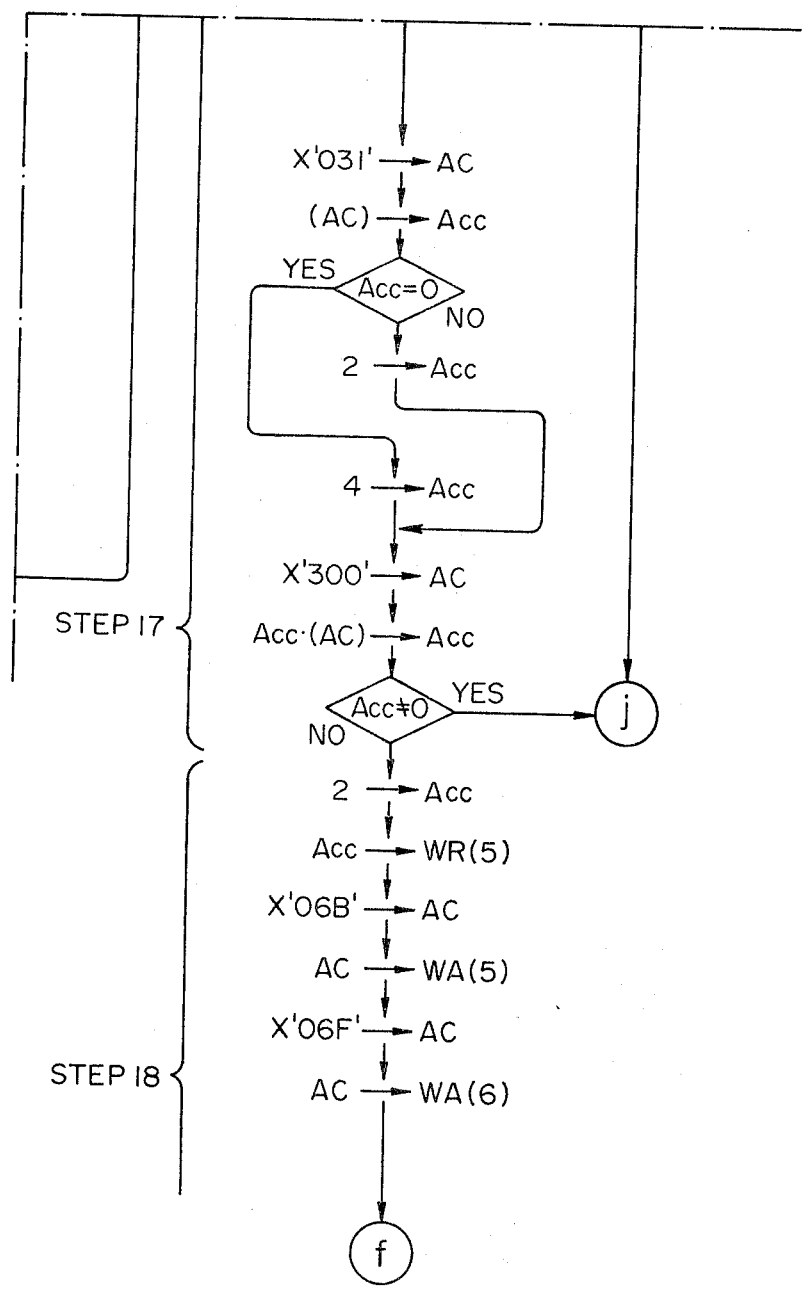
Figure 17A:
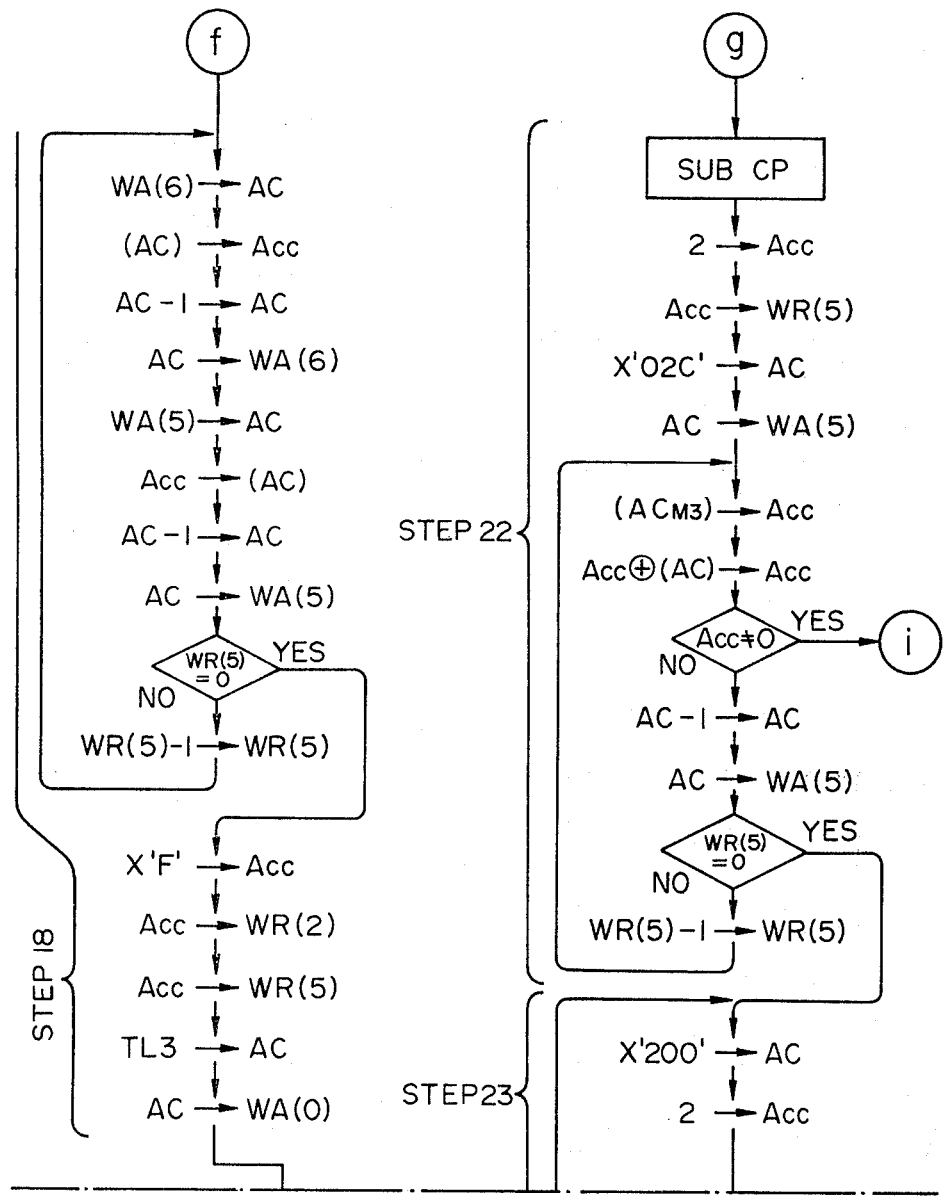
Figure 17B:
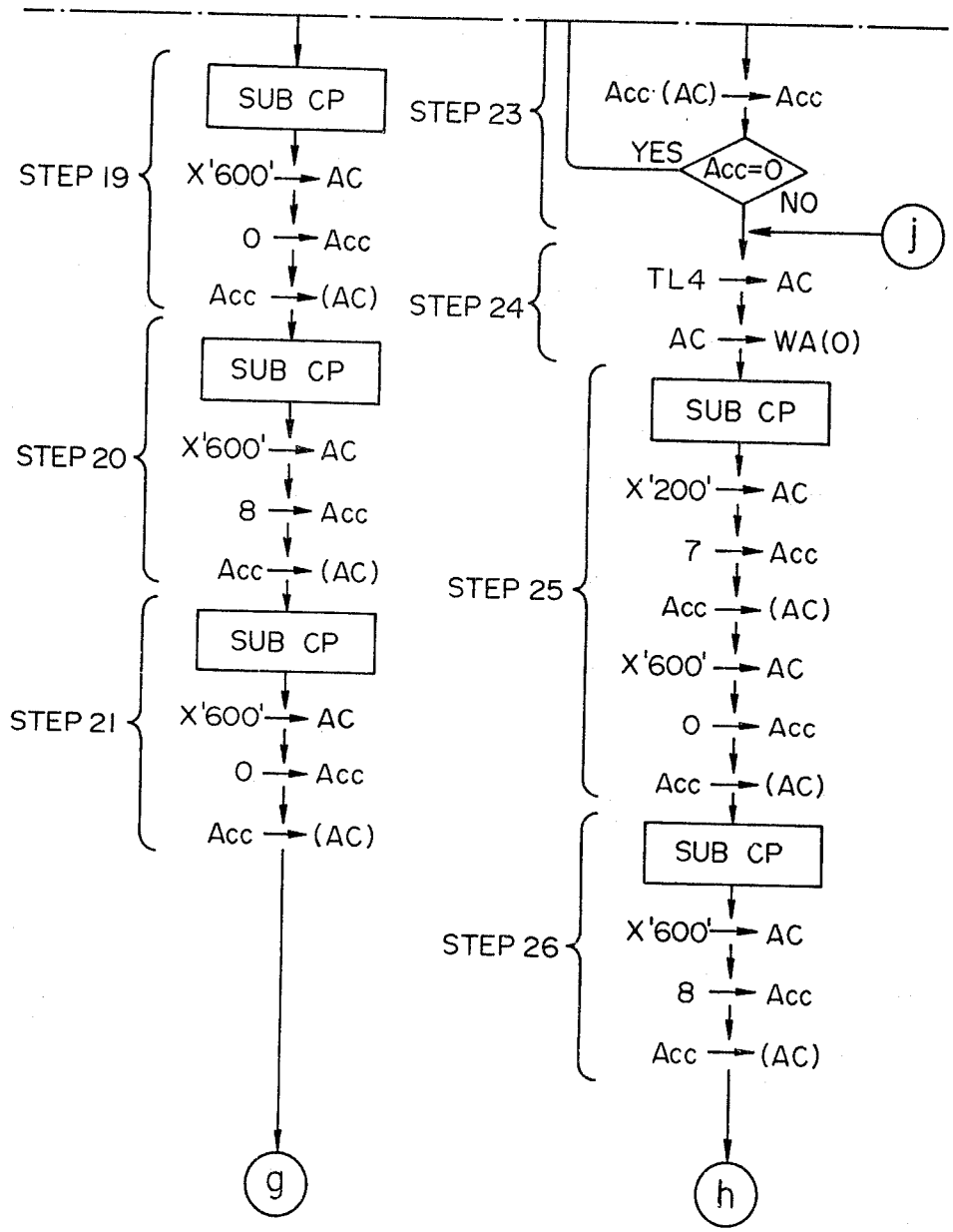
Figure 17C:
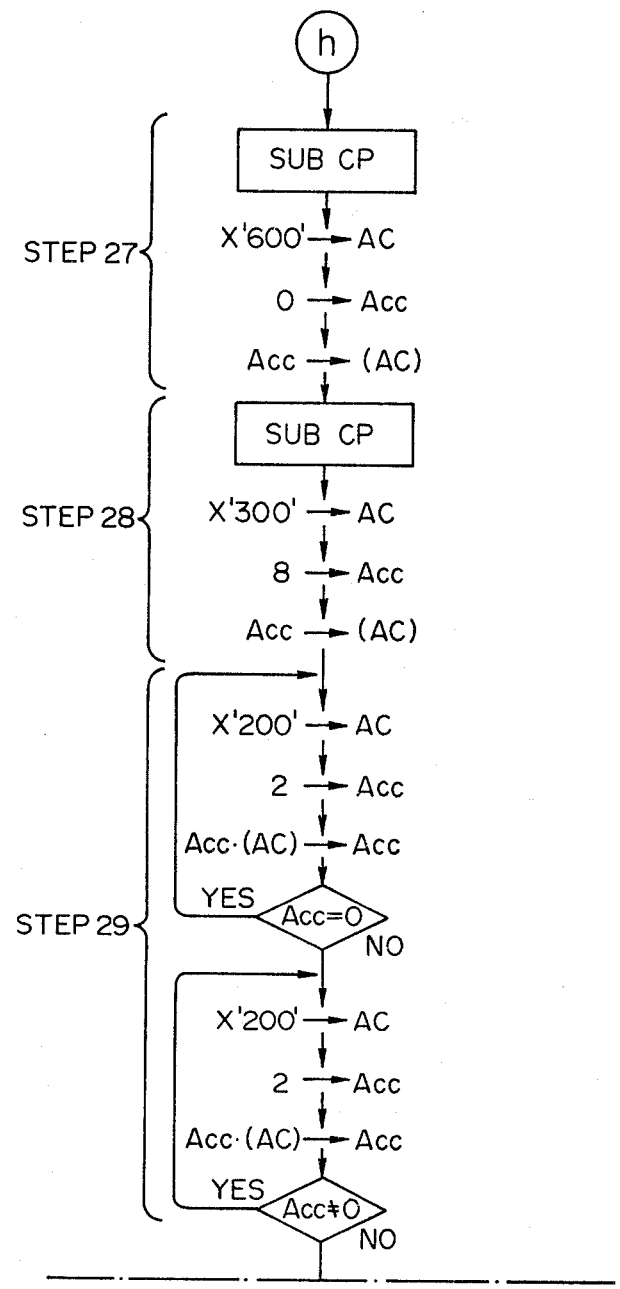
Figure 17D:
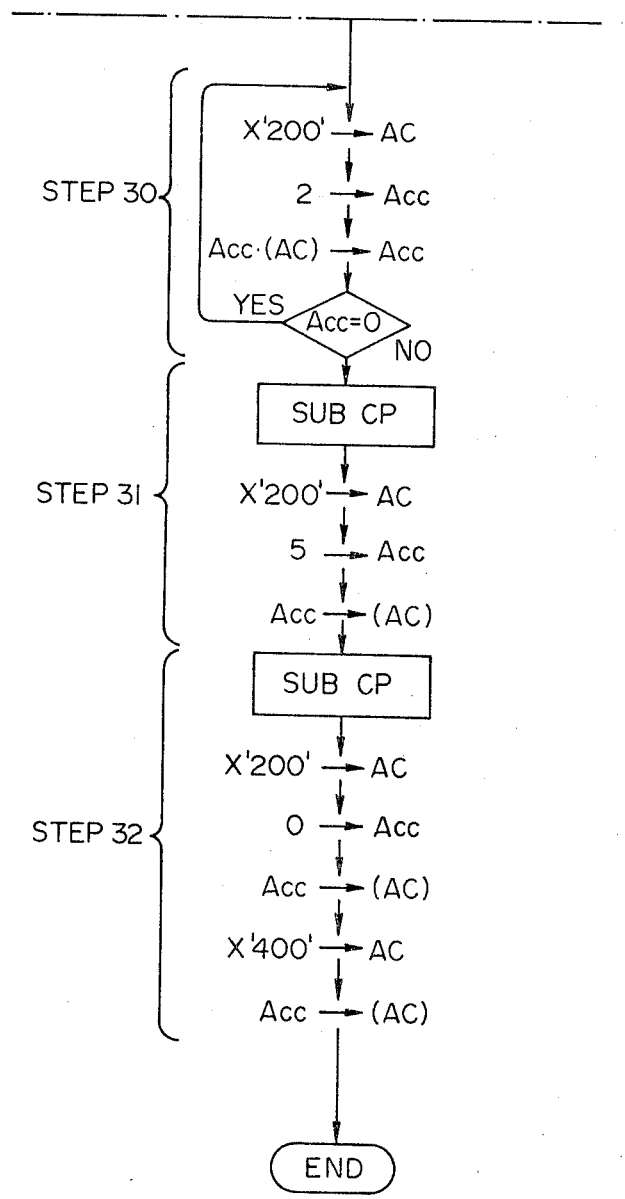
Figure 18A:
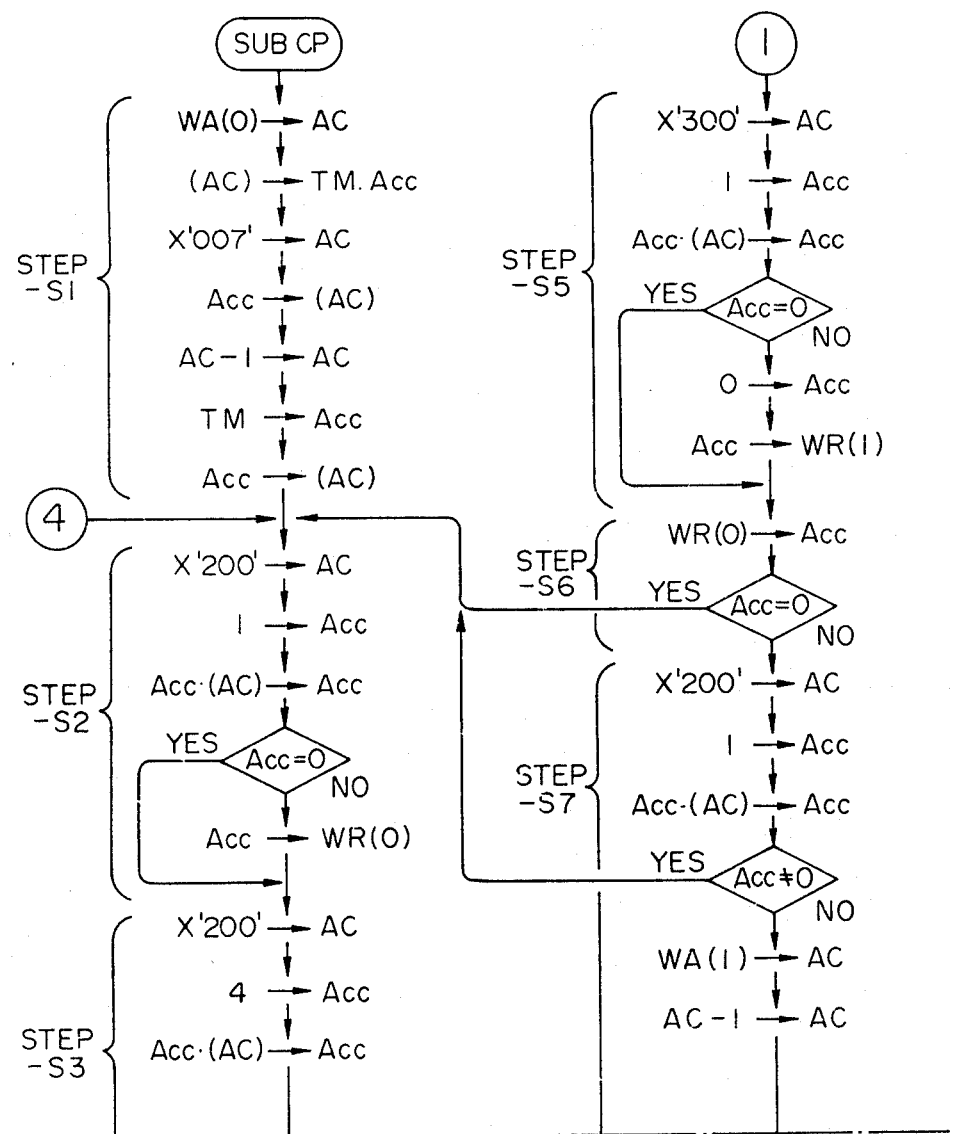
Figure 18B:
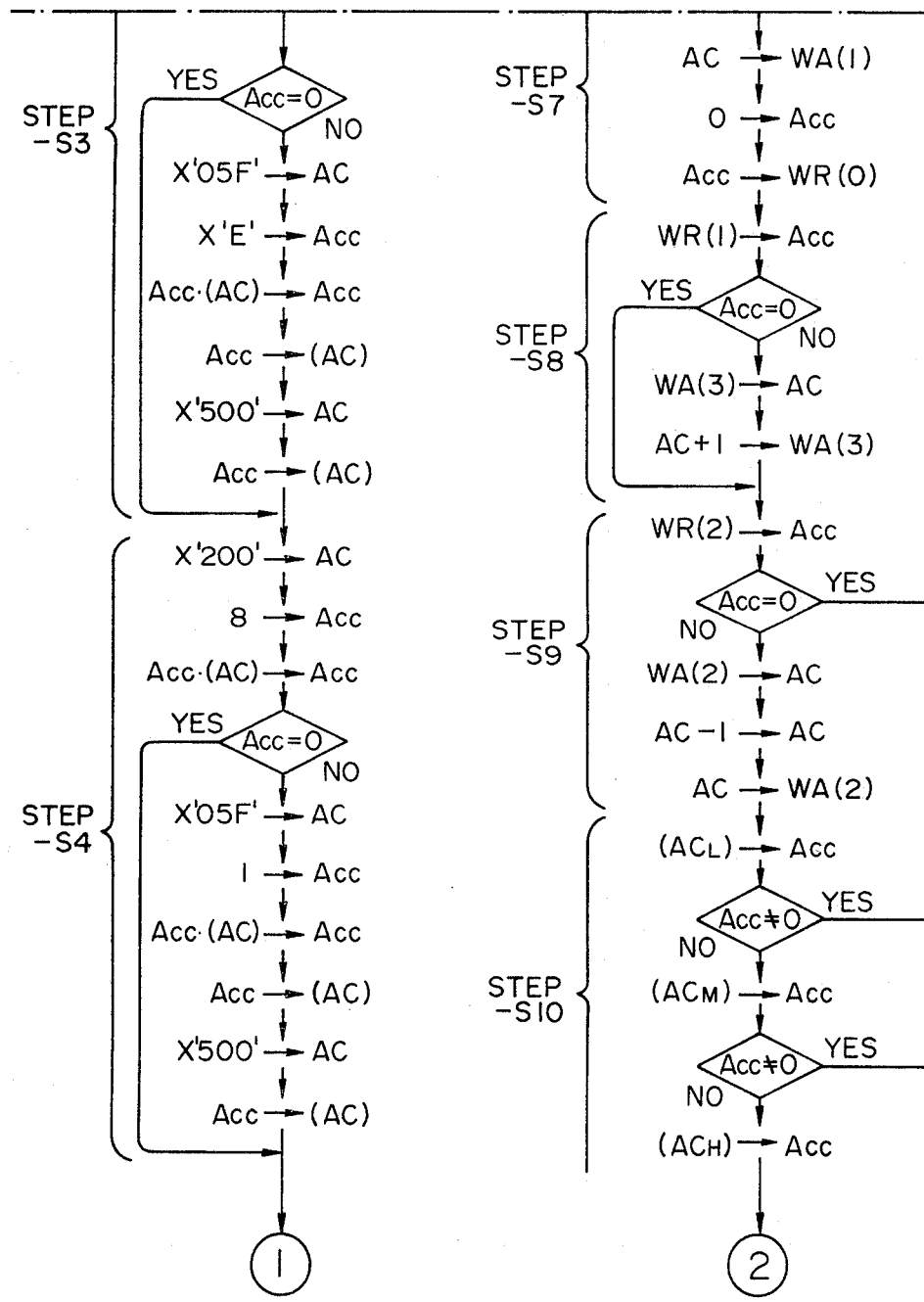
Figures 18C, 19:
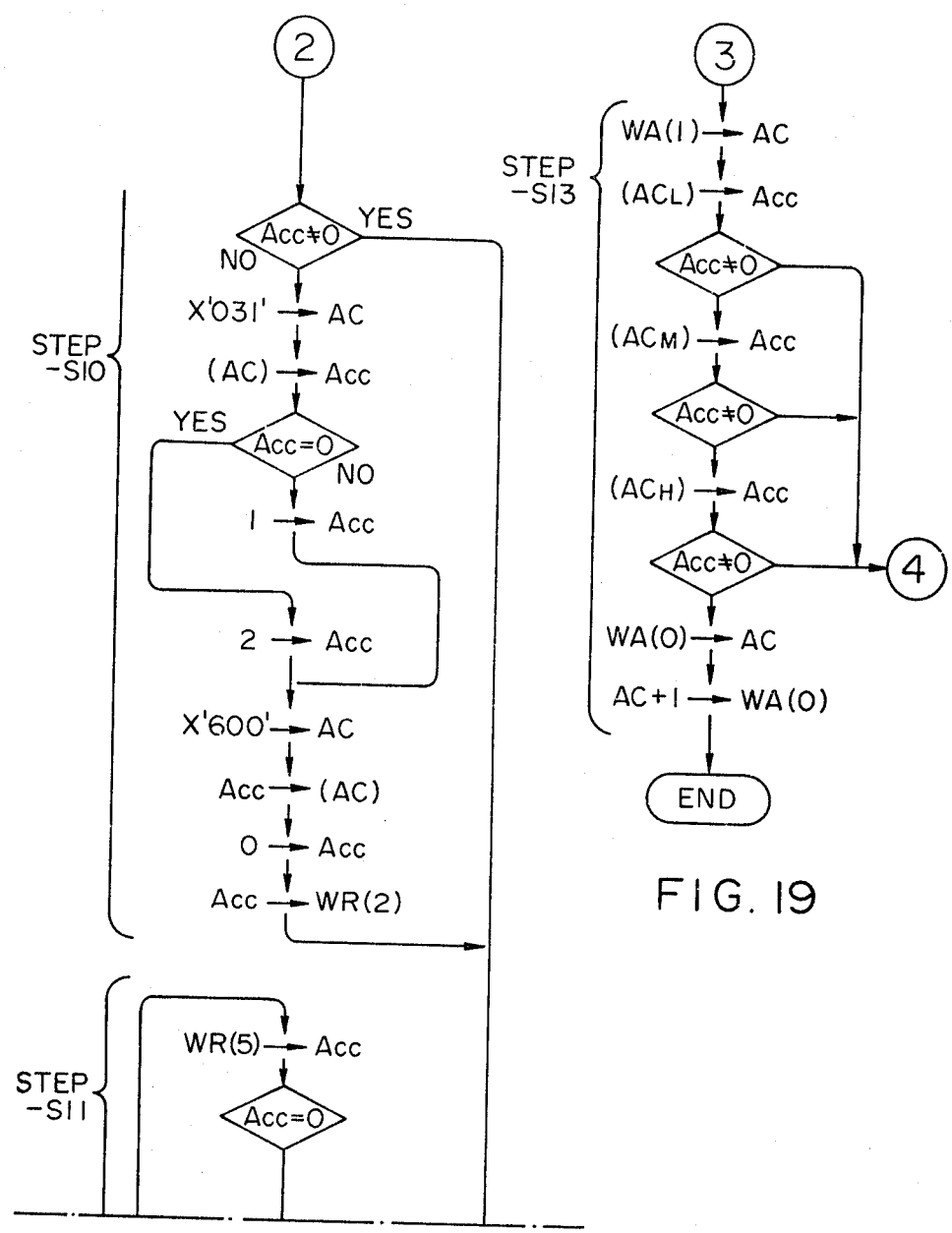
Figure 18D:
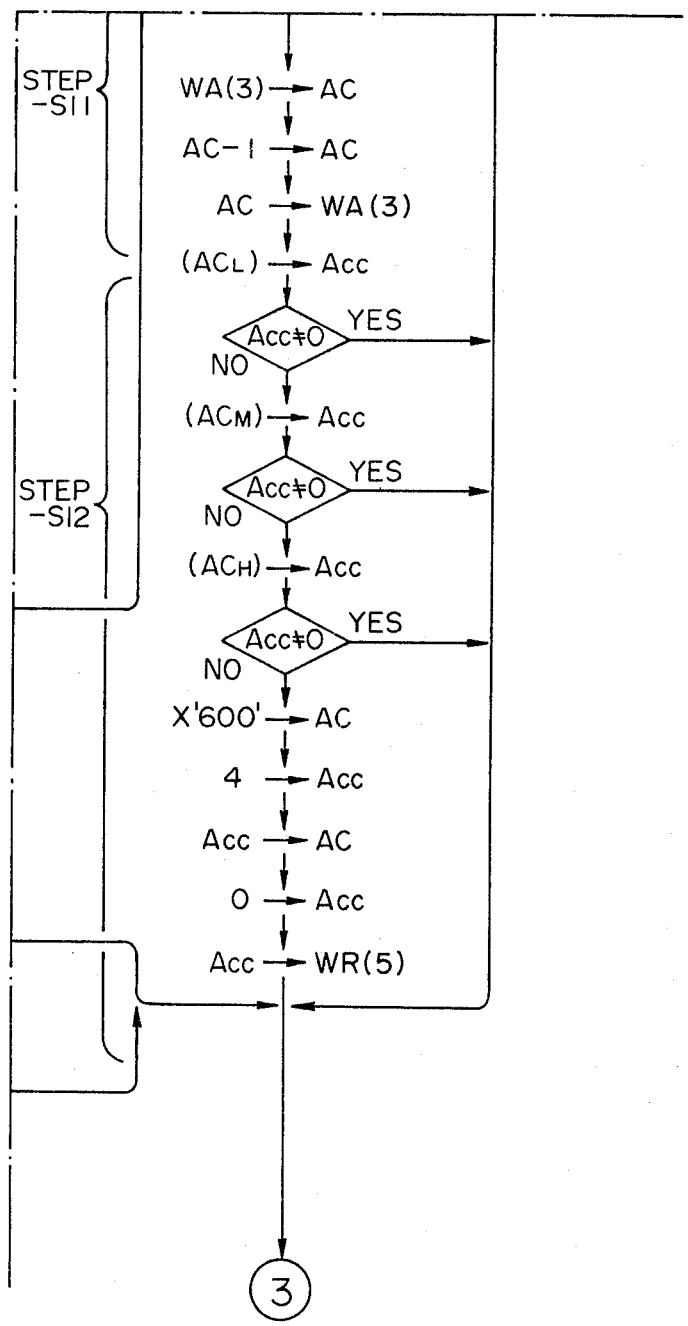

The flow chart of FIG. 8 has been described. FIGS. 18 and 19 are microflow charts which show the flow chart of FIG. 8 in greater detail.

Figure 12:
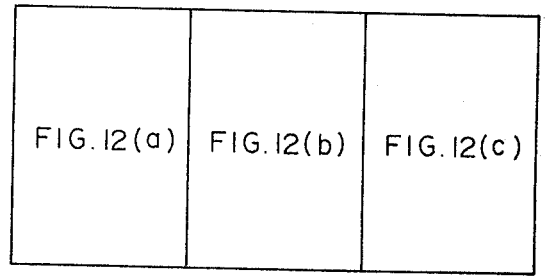
FIGS. 12, 12a-12c illustrate the control timing in the second embodiment.
Figure 9A:
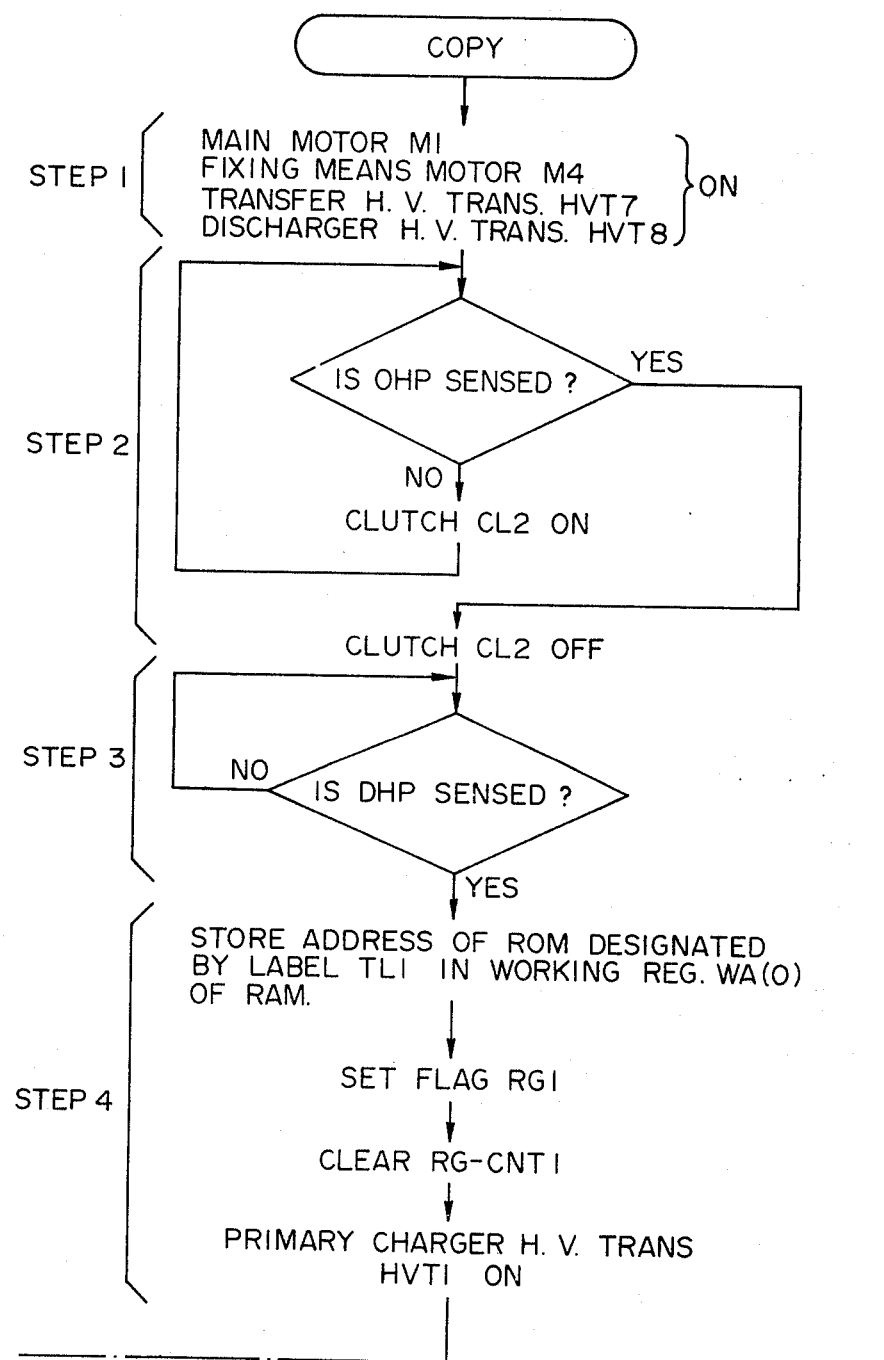
Figure 9B:
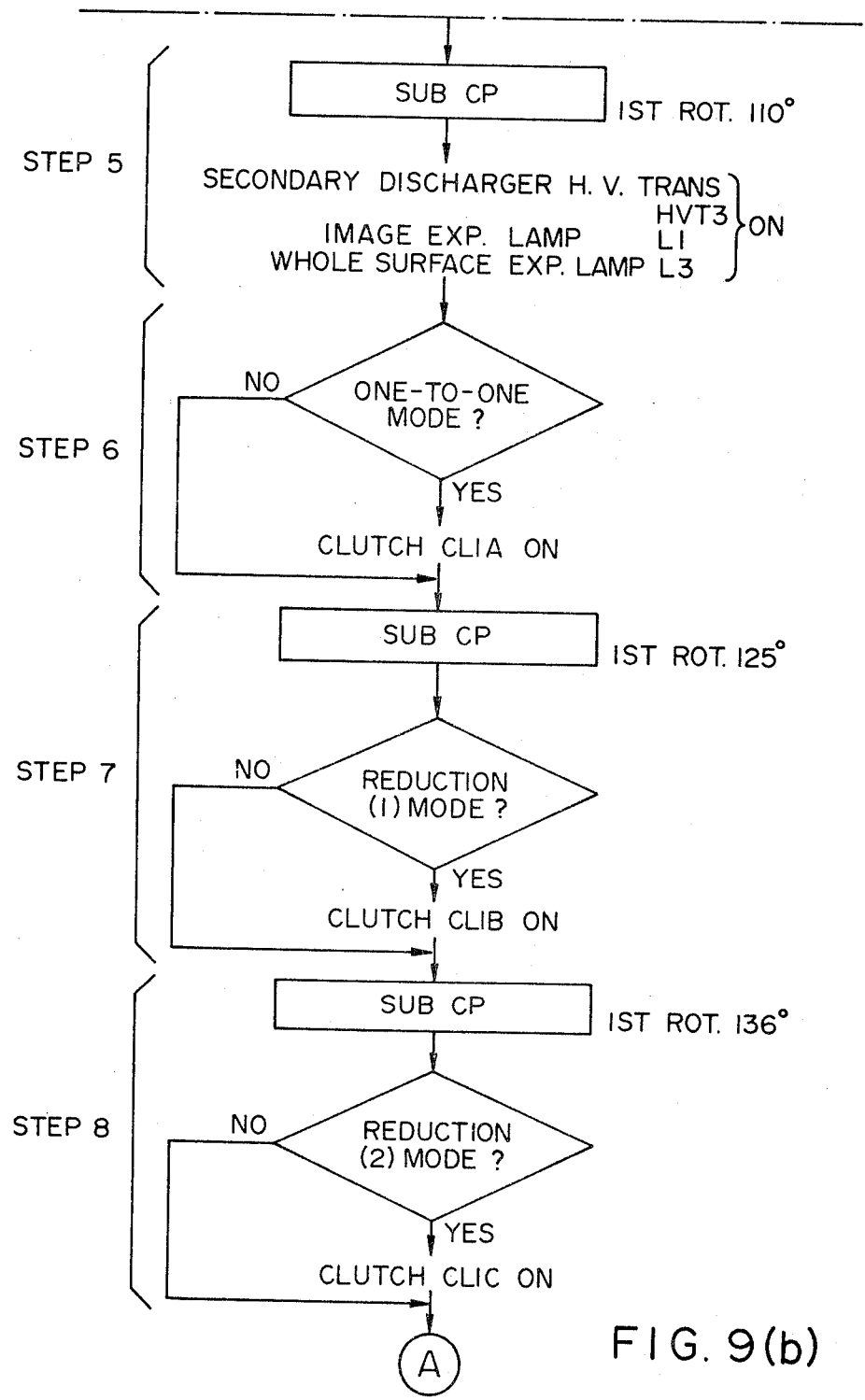
Figure 9C:
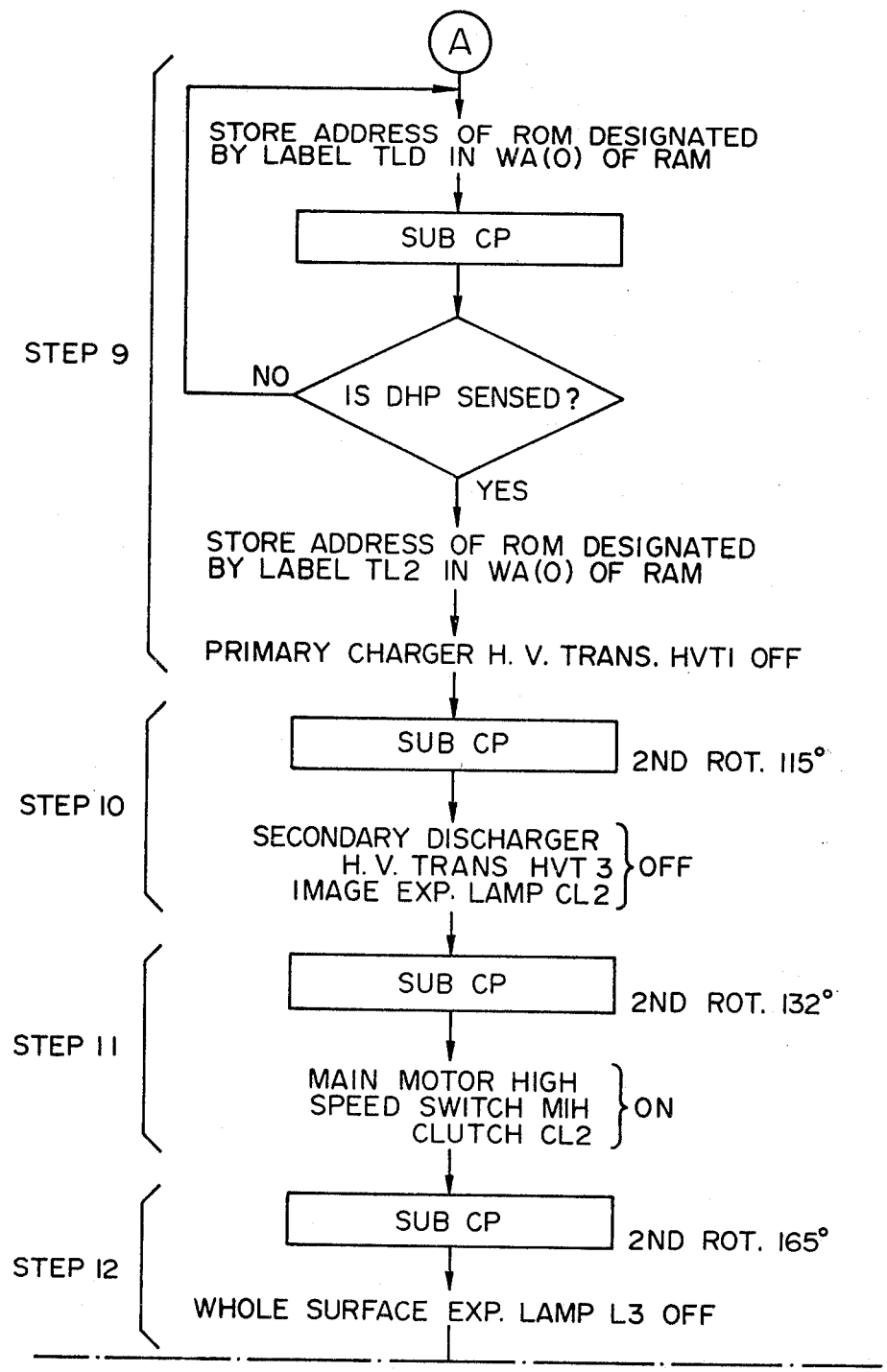
Figure 9D:
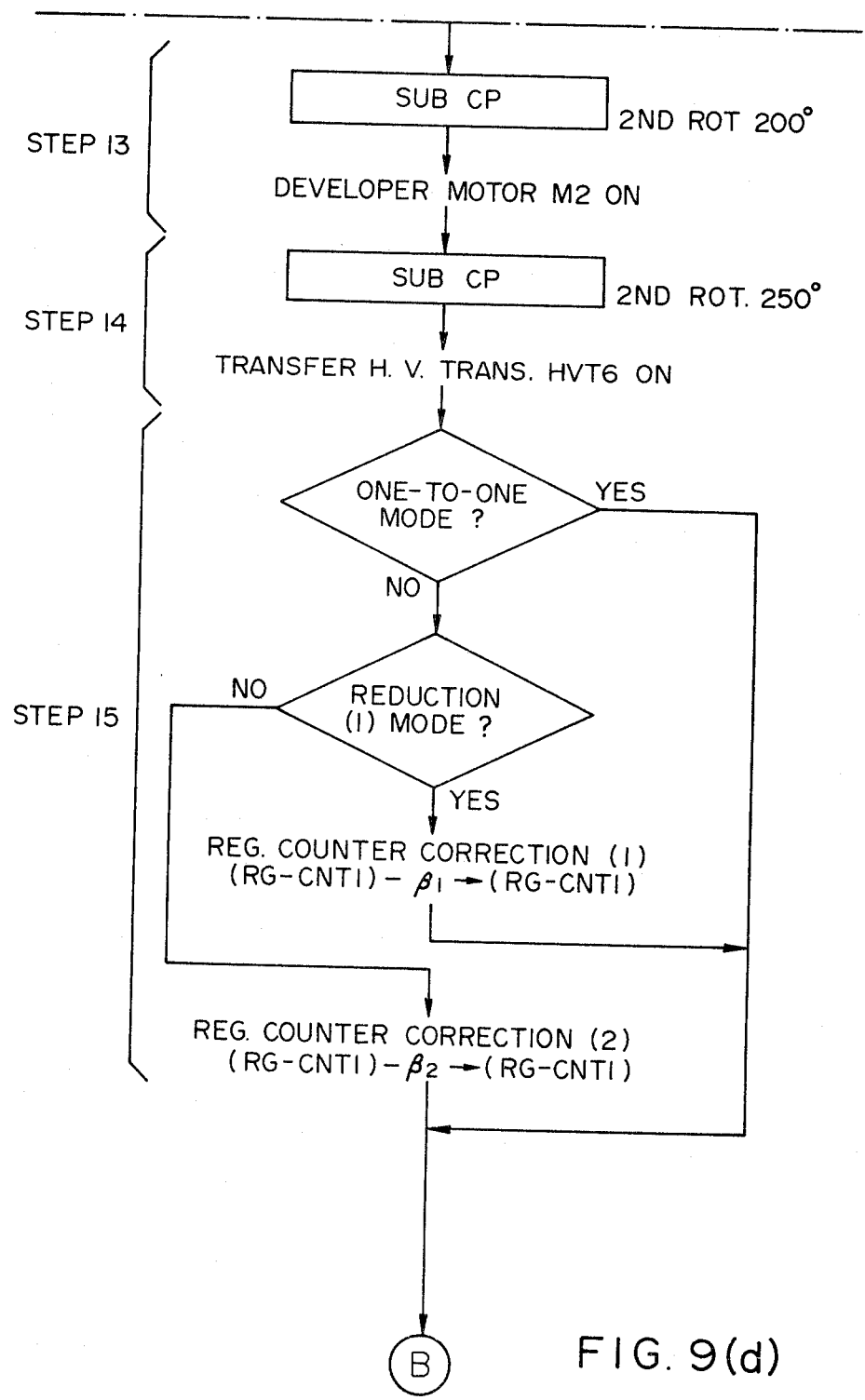
Figure 9E:
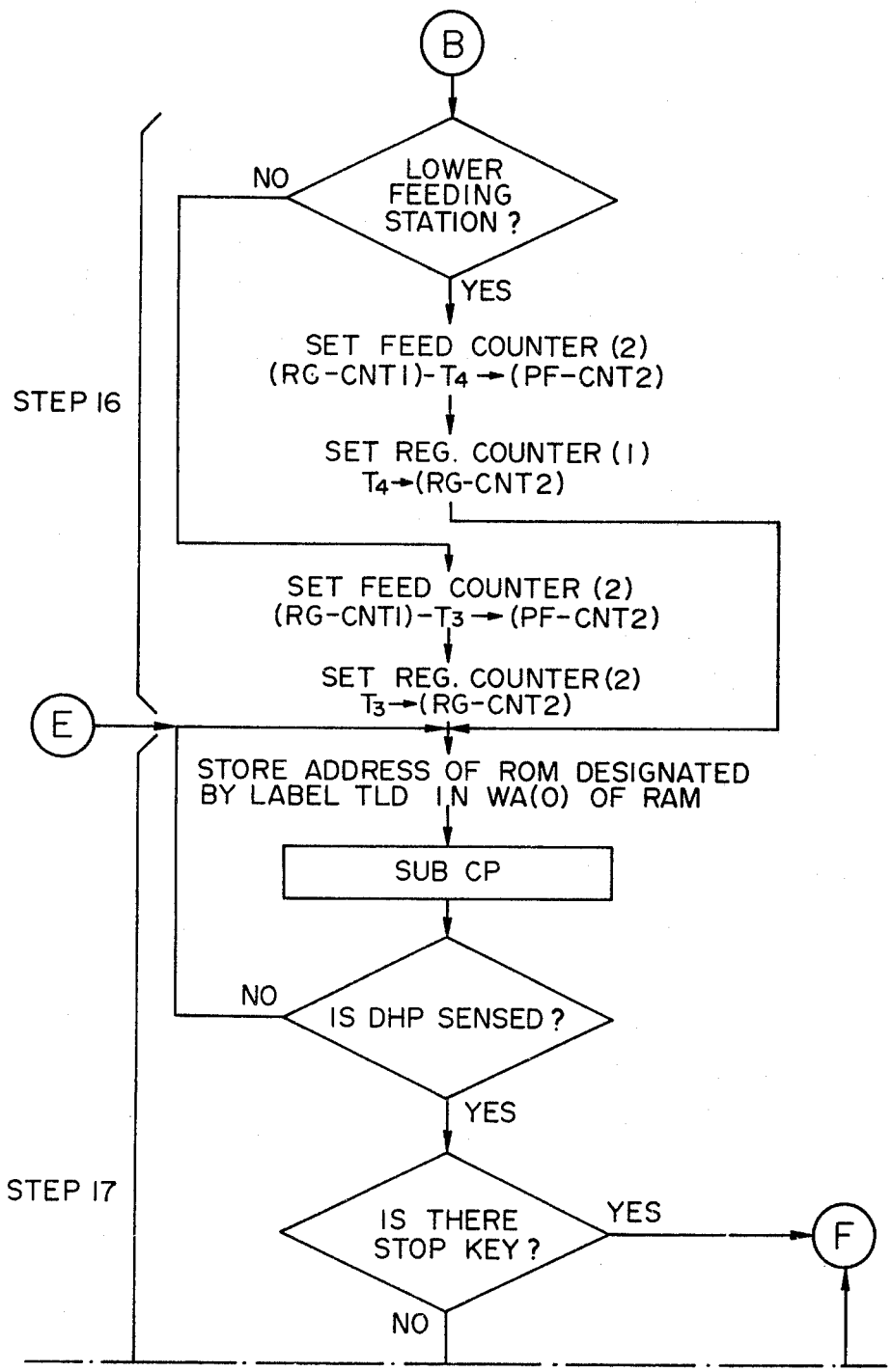
Figure 9F:
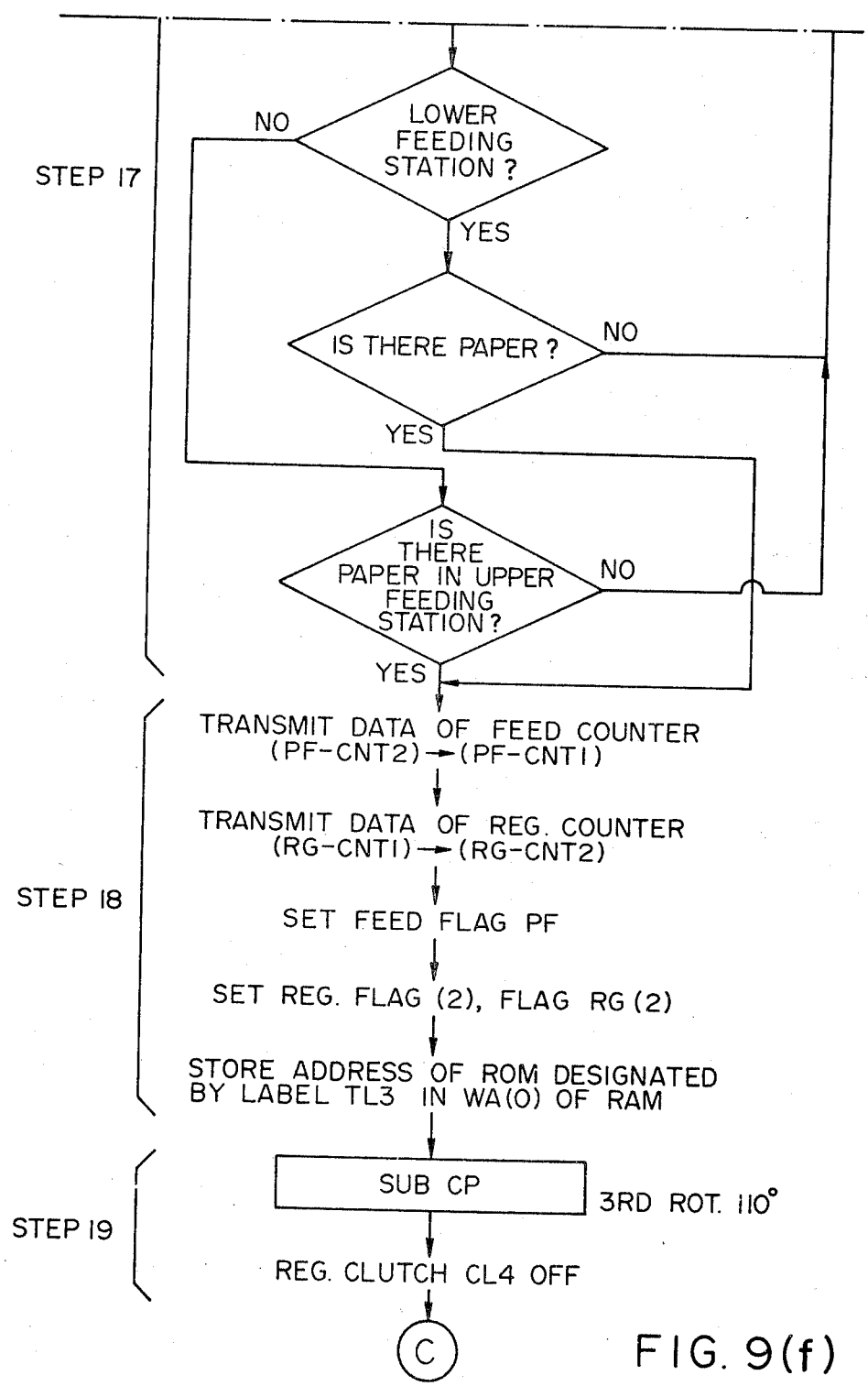
Figure 10A:
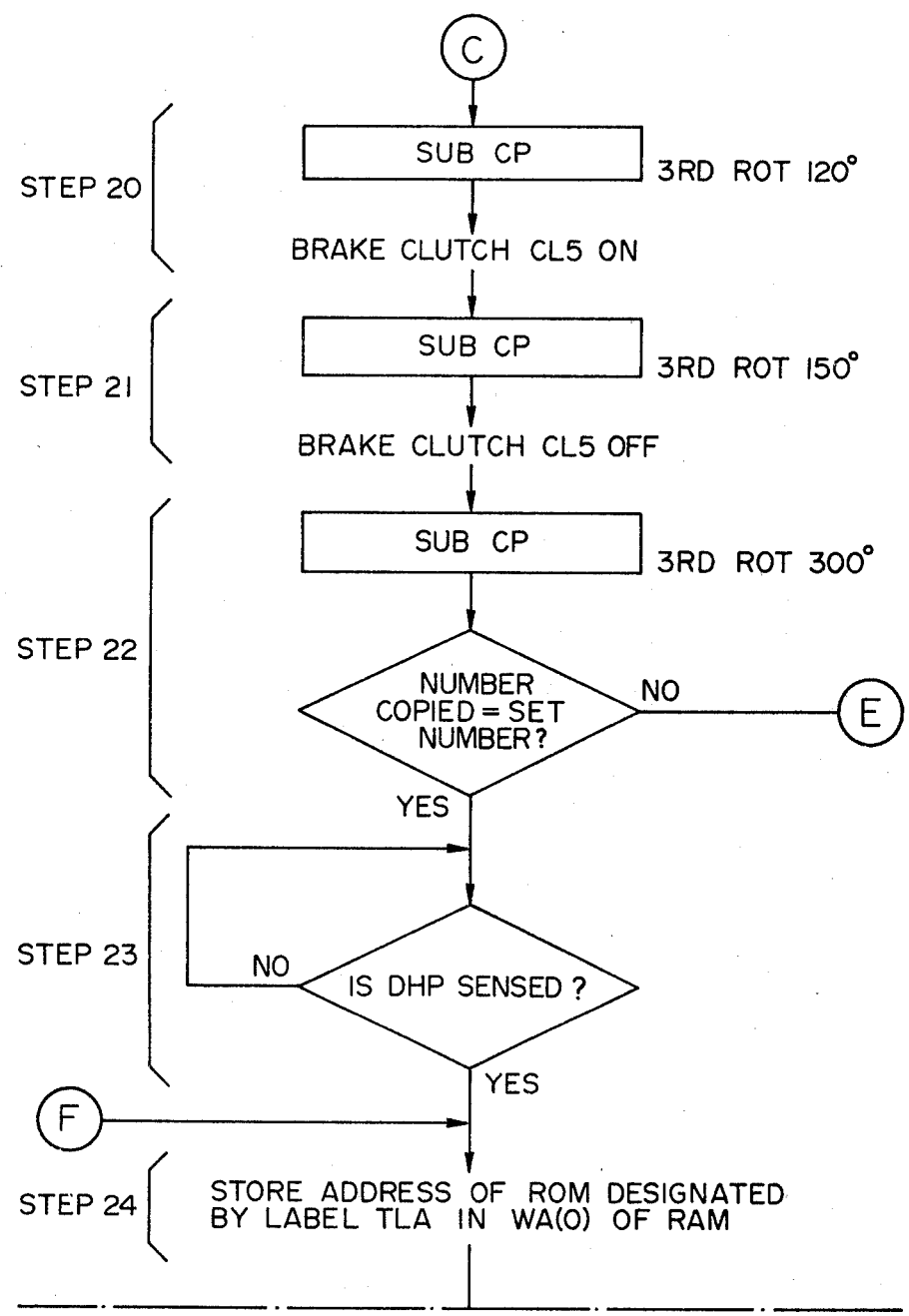
Figure 10B:
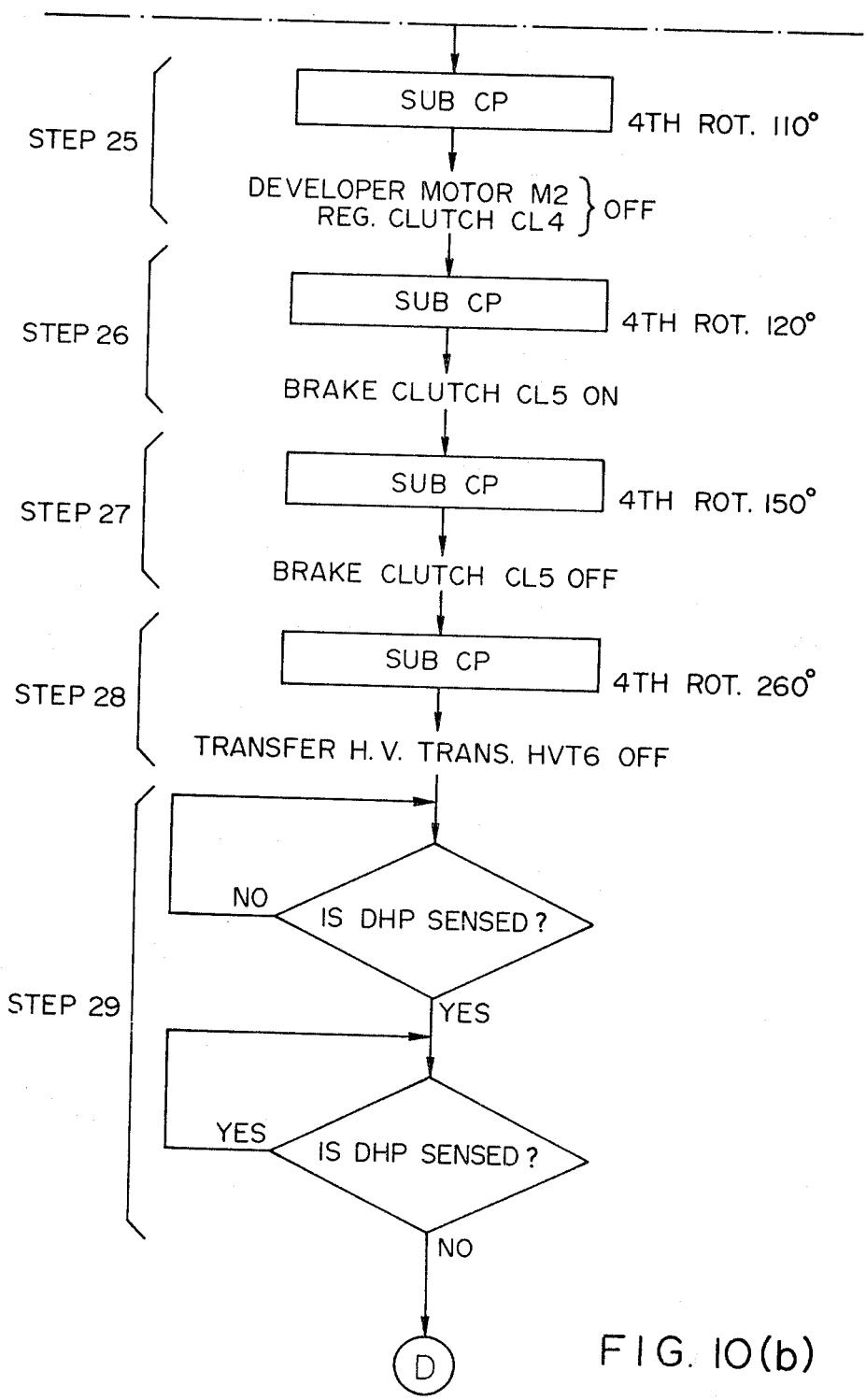
Figure 10C:
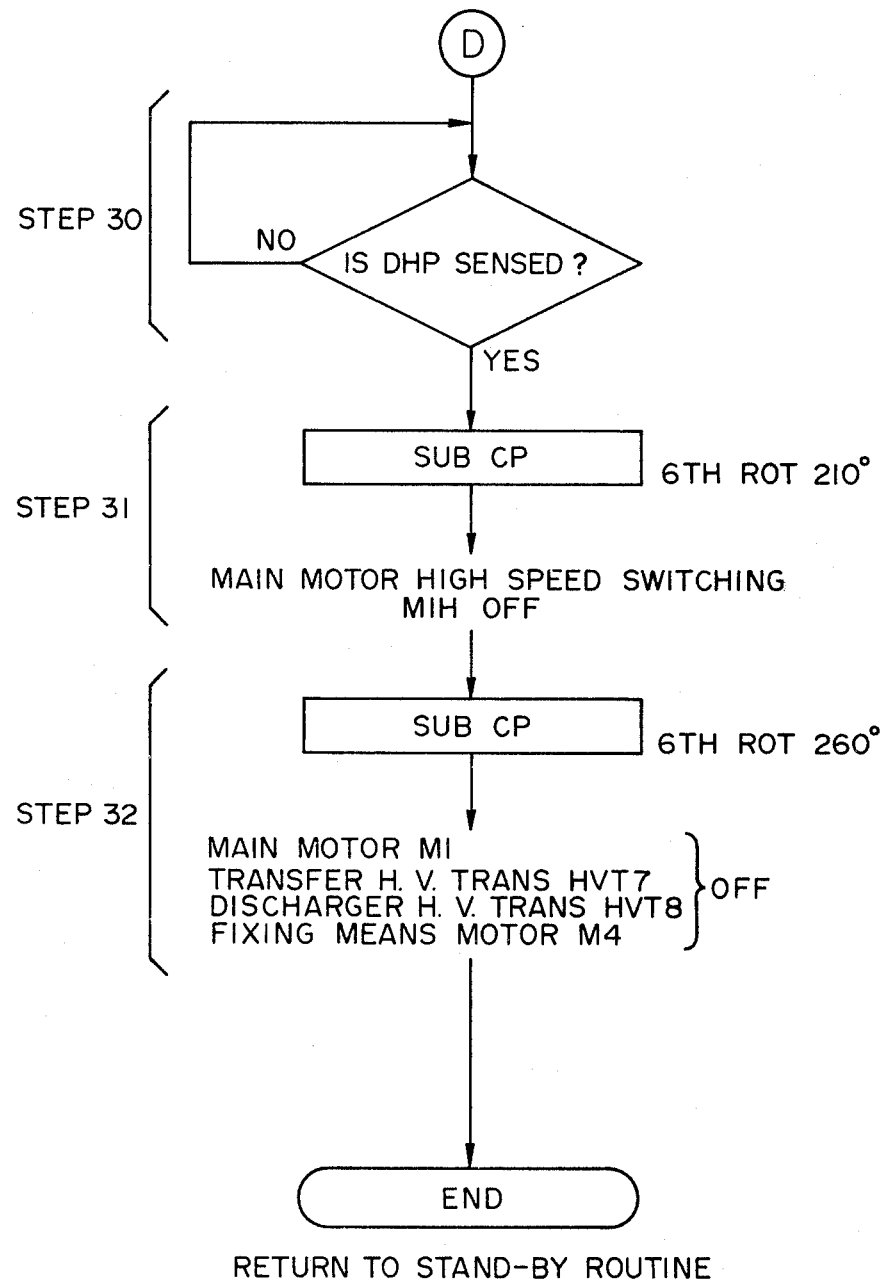
Figure 11A:
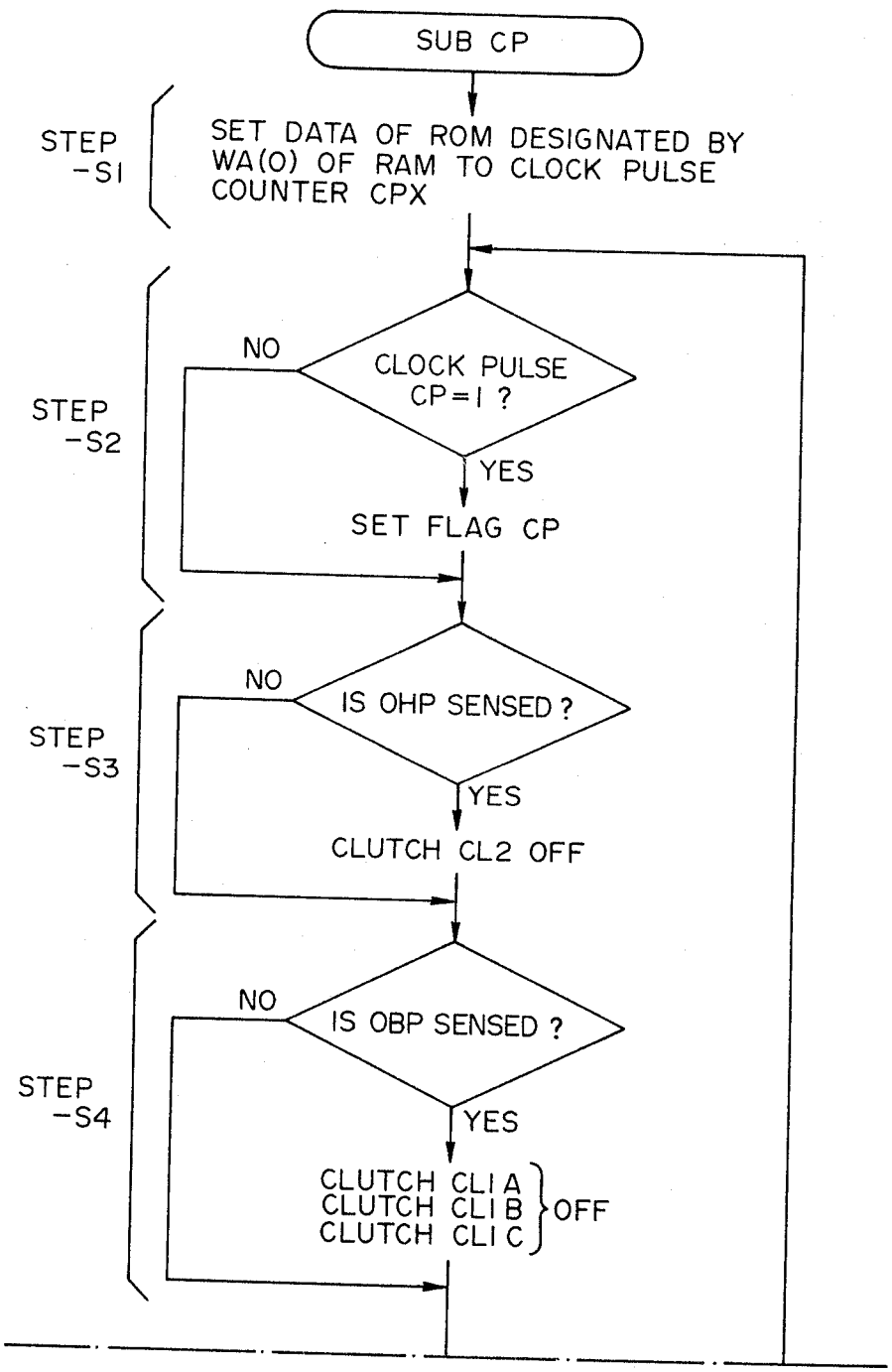
Figure 11B:
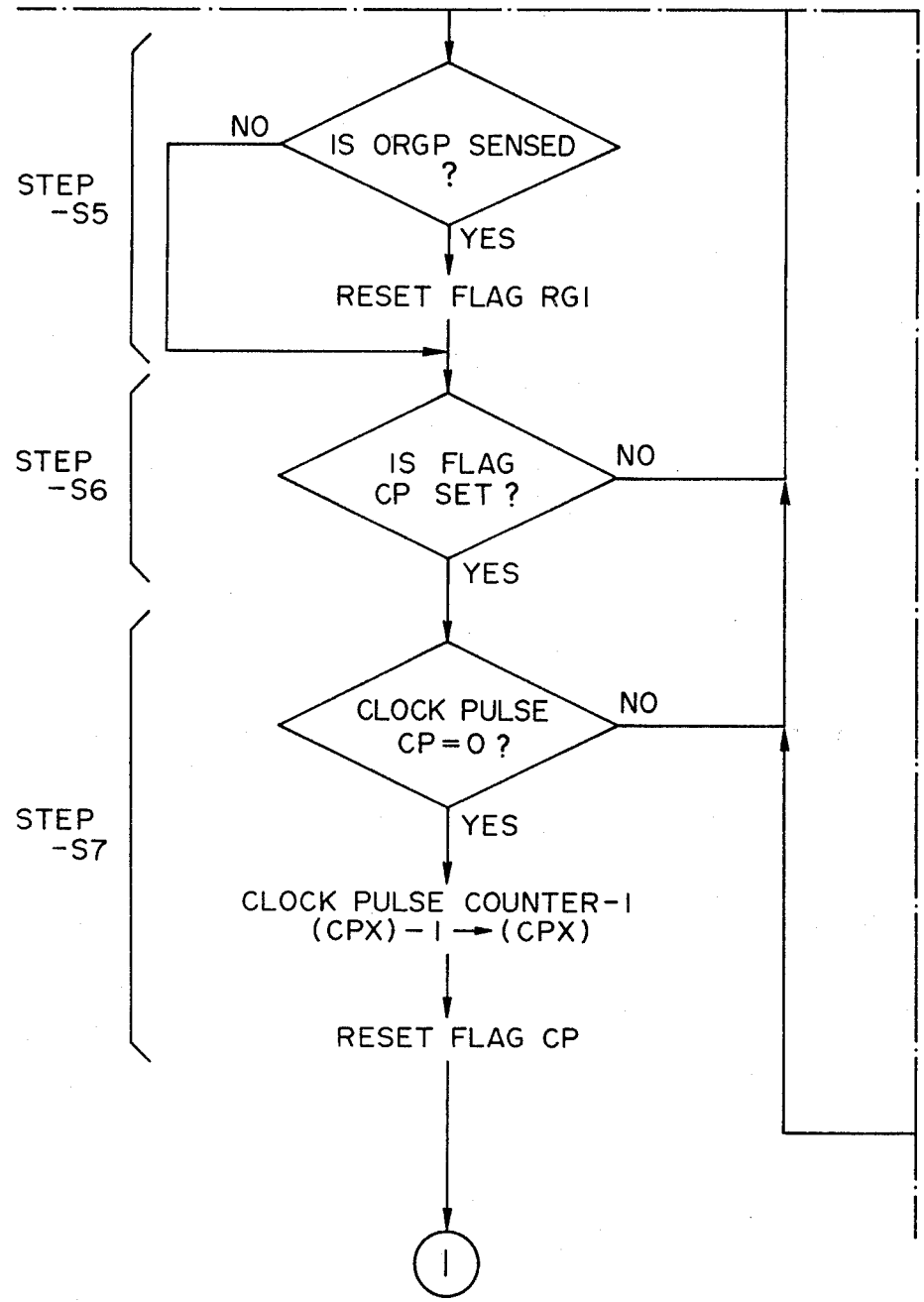
Figure 11C:
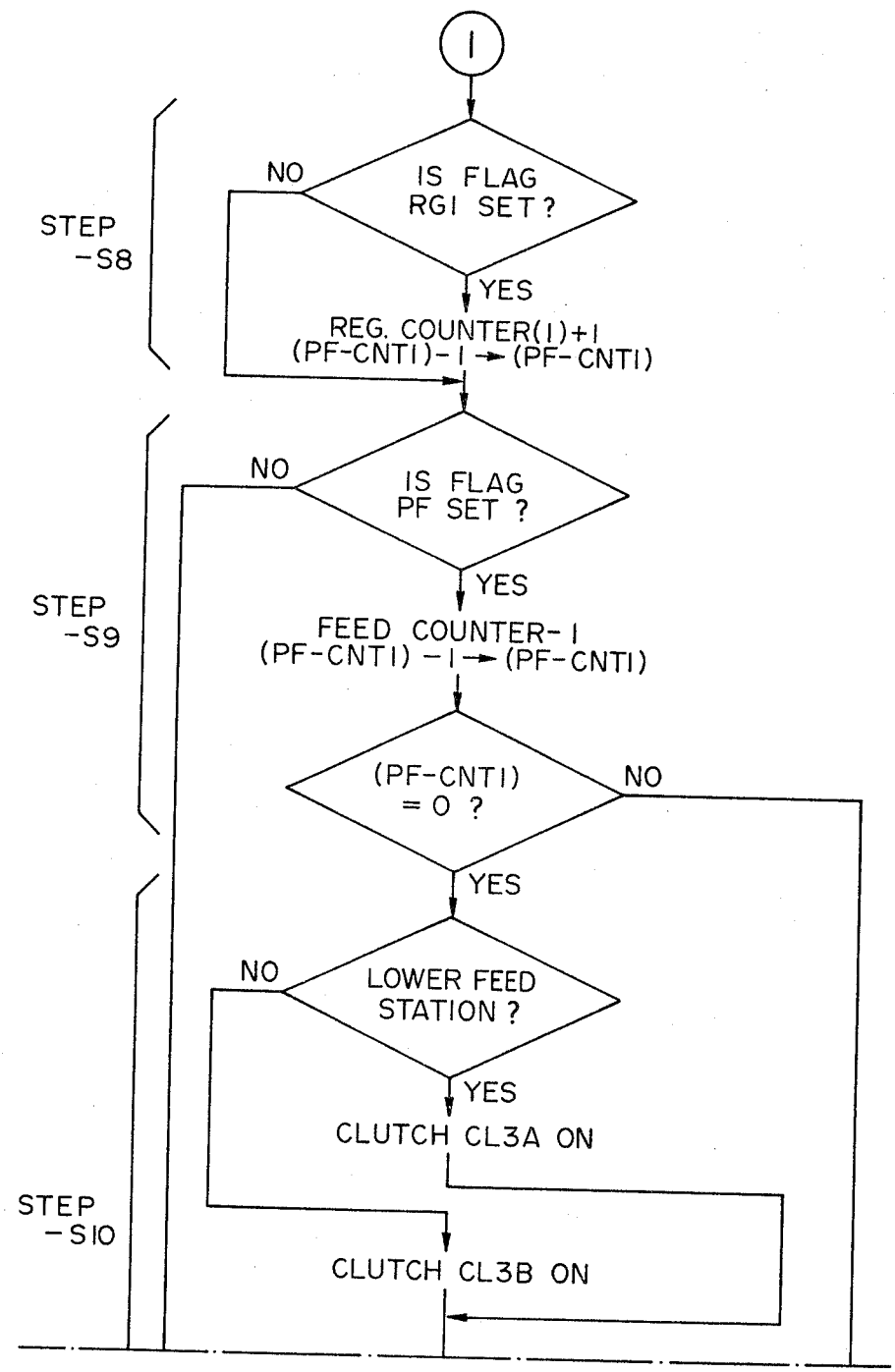
Figure 11D:
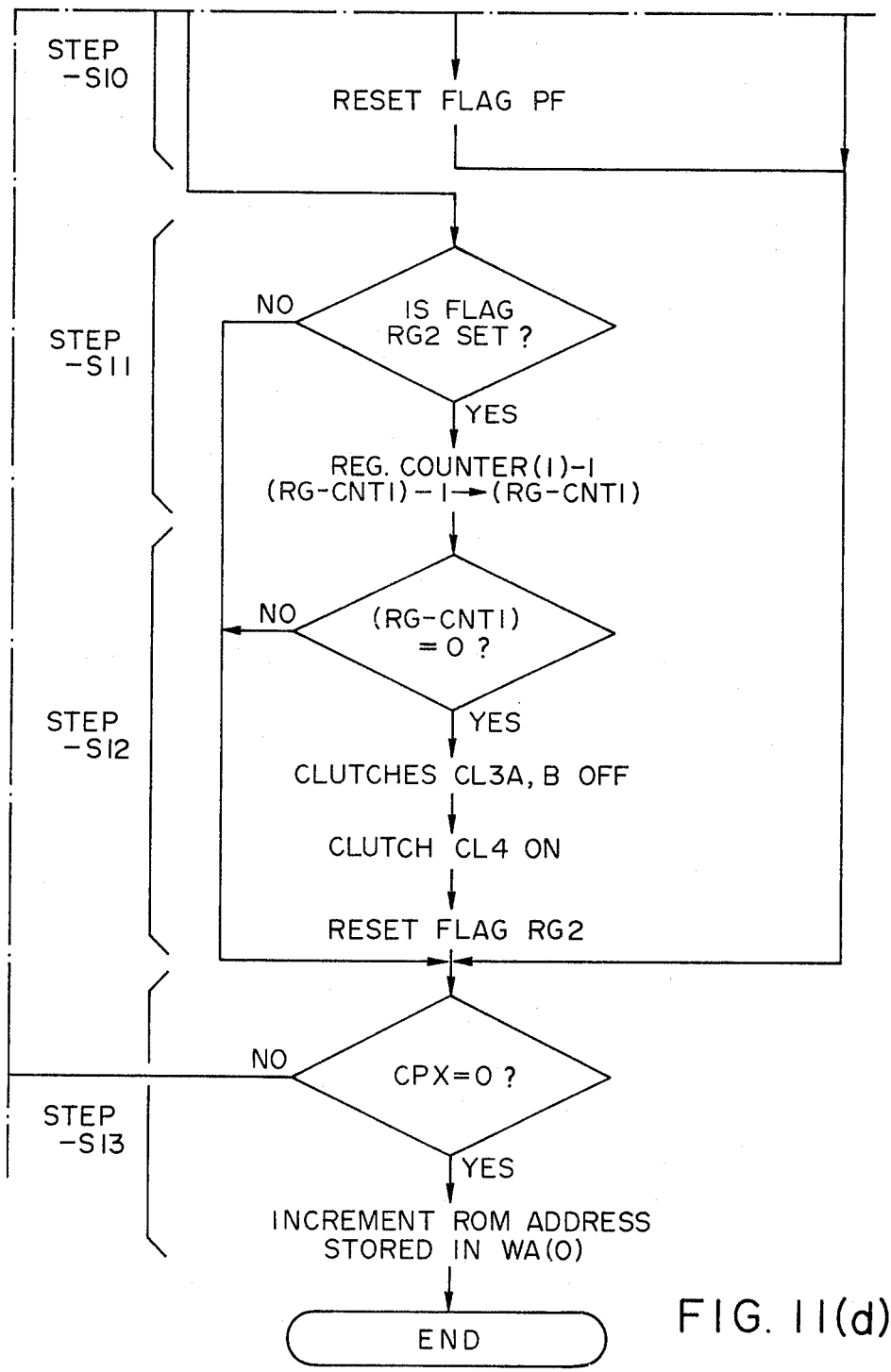
Figure 12A:
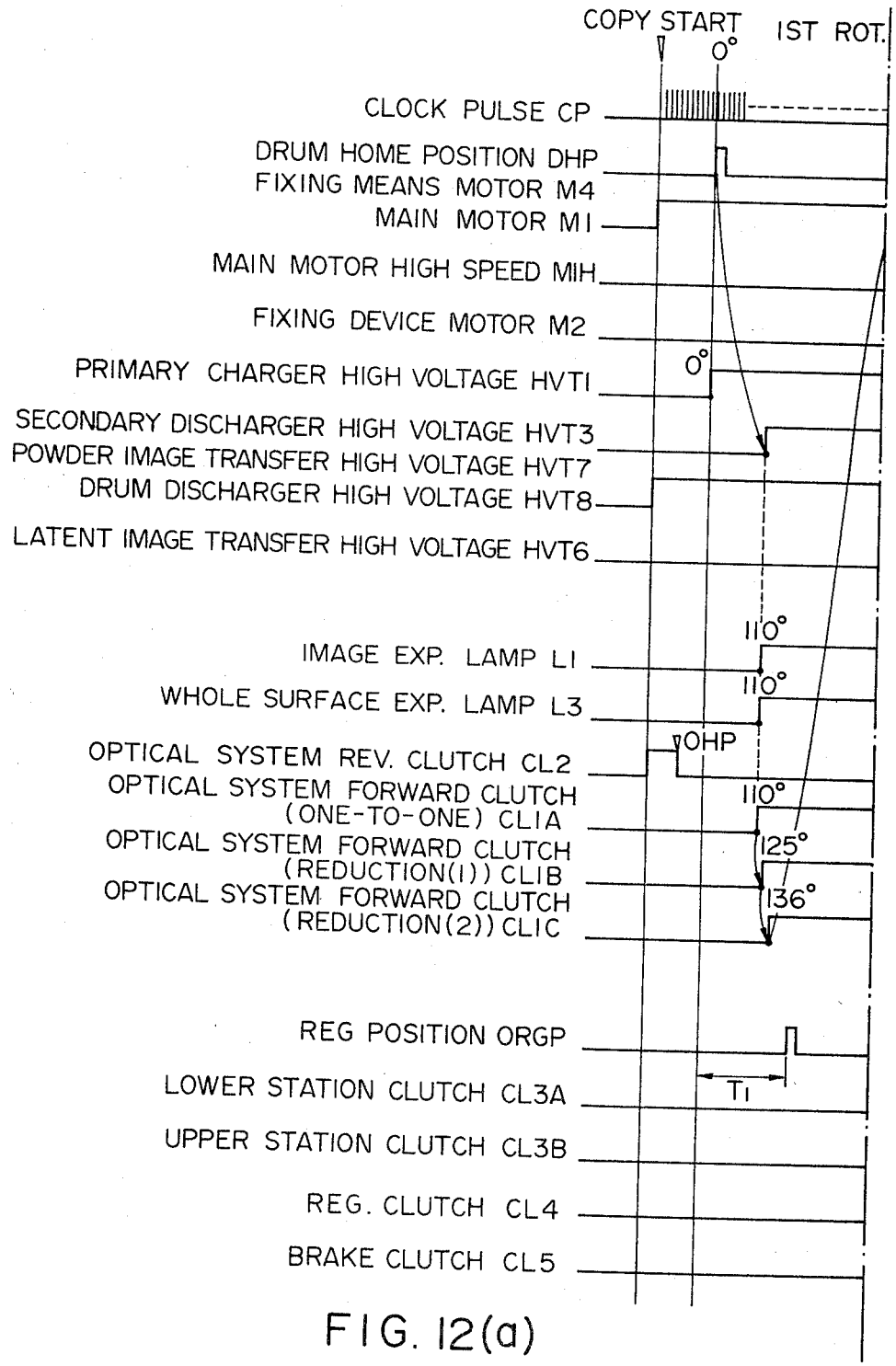
Figure 12B:
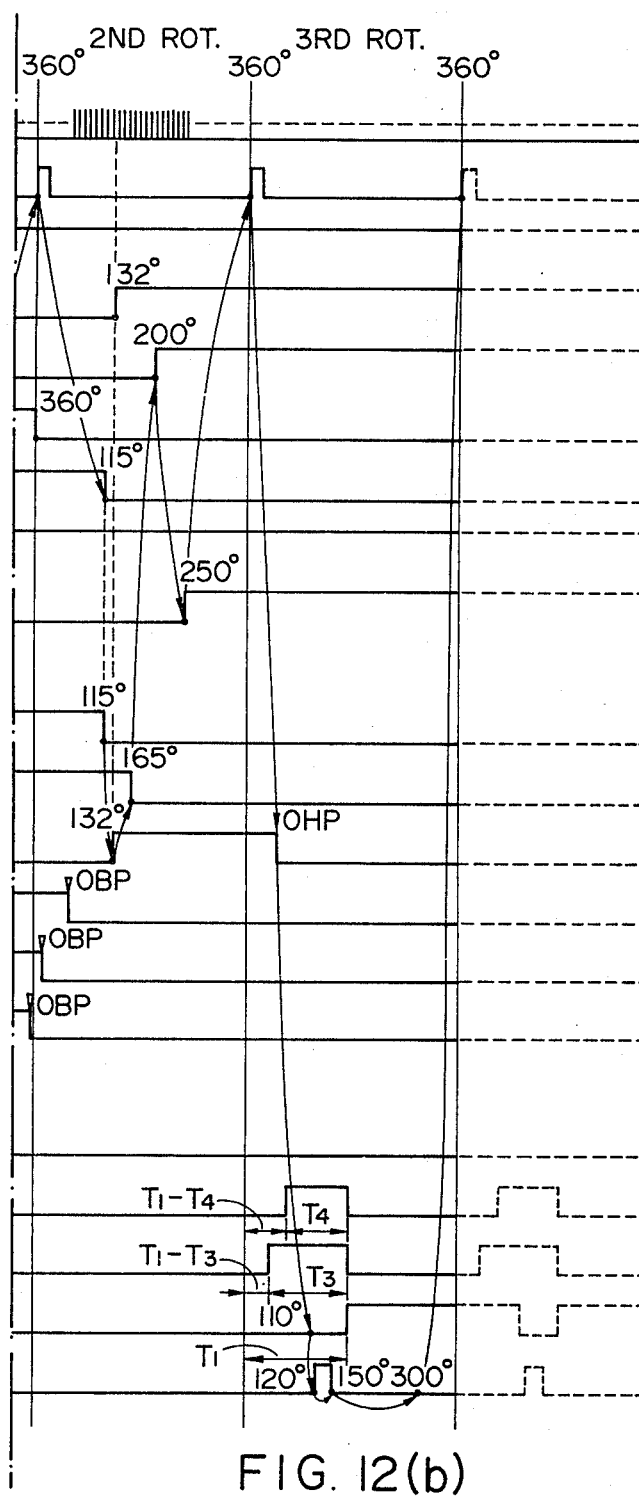
Figure 12C:
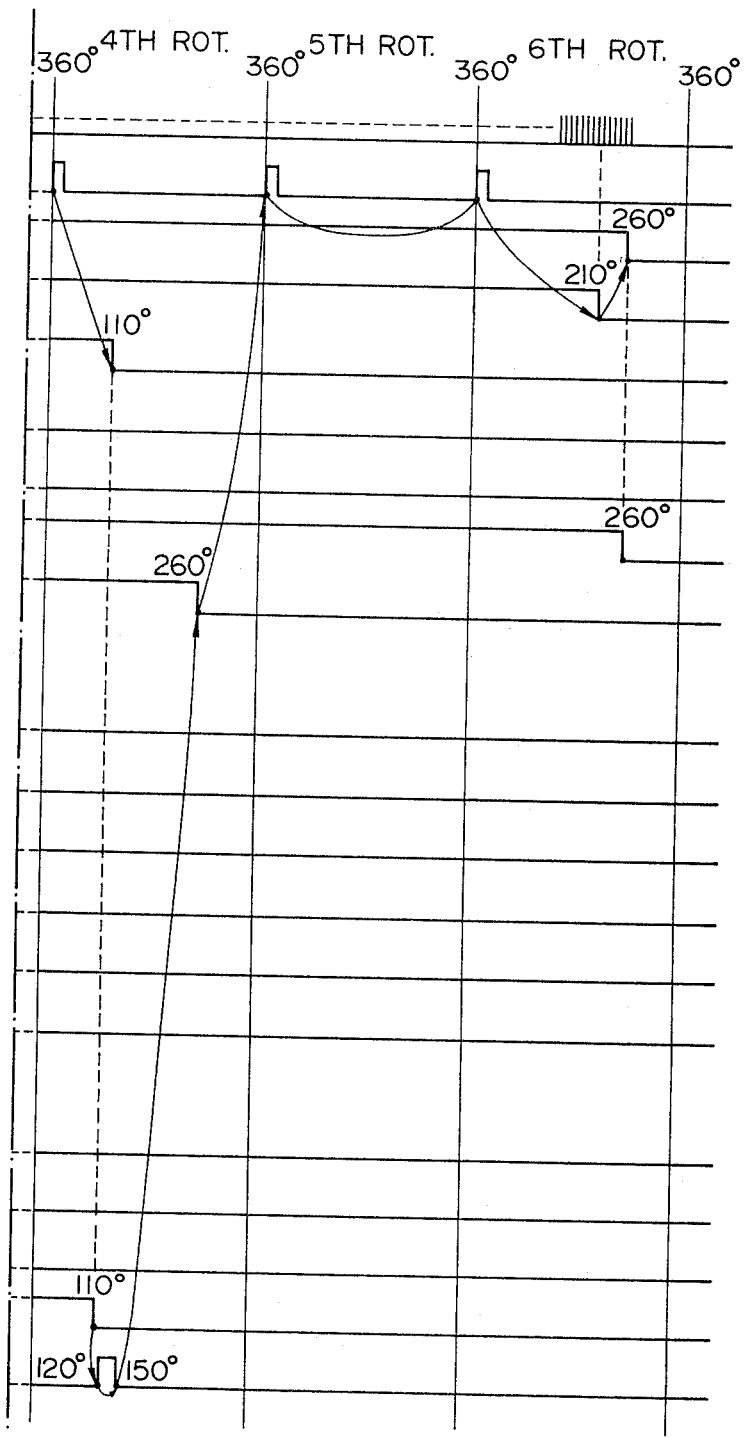

FIG. 12 is a timing chart, in which arrows show the clock pulse count effected in each subroutine SUBCP. The table below shows the relation among the address of ROM of the label determining the numerical value of CPX in RAM, the stored data and the drum angle.

TABLE 1

| Label | ROM address $AC_H\ AC_M\ AC_L$ | ROM data (hexadecimal) OPR OPA | ROM data converted to decimal | Drum angle | |
|---|---|---|---|---|---|
| $TL_1$ | F 0 0 | 6 E | 110 | <DHP ↑ | 110° |
|  | F 0 1 | 0 F | 15 | 1st rot. | 125° |
|  | F 0 2 | 1 0 | 16 | ↓ <DHP | 136° |
| $TL_2$ | F 0 3 | 7 3 | 115 |  | 115° |
|  | F 0 4 | 1 1 | 17 | ↑ | 132° |
|  | F 0 5 | 2 1 | 33 | 2nd rot. | 165° |
|  | F 0 6 | 2 3 | 35 |  | 200° |
|  | F 0 7 | 3 2 | 50 | ↓ | 250° |
| $TL_3$ | F 0 8 | 6 E | 110 | <DHP ↑ | 110° |
|  | F 0 9 | 0 A | 10 | 3rd rot. | 120° |
|  | F 0 A | 1 E | 30 | ↓ | 150° |
|  | F 0 B | 9 6 | 150 |  | 300° |
| $TL_4$ | F 0 C | 6 E | 110 | <DHP ↑ | 110° |
|  | F 0 D | 0 A | 10 | 4th rot. | 120° |
|  | F 0 E | 1 E | 30 | ↓ | 150° |
|  | F 0 F | 6 E | 110 |  | 260° |
|  | F 1 O | D 2 | 210 | <DHP,DHP ↑ | 210° |
|  | F 1 1 | 3 2 | 50 | 6th rot. | 260° |
| $TL_D$ | F 1 2 | 0 1 | 1 |  |  |

Figure 13B:
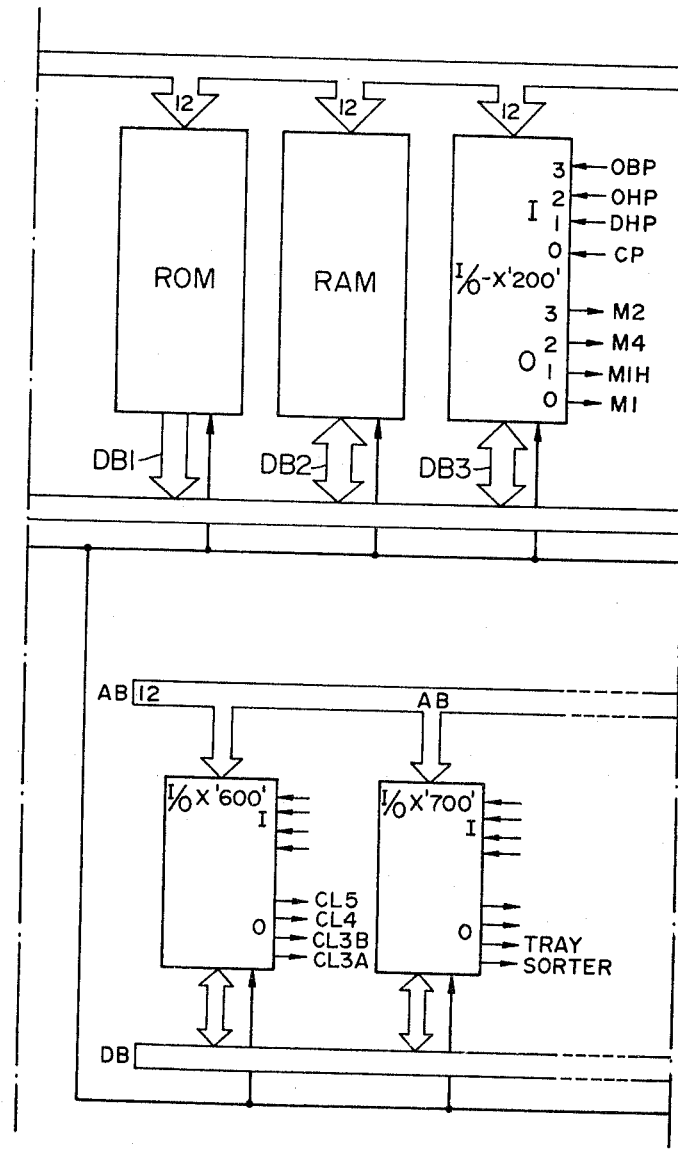
Figure 13C:
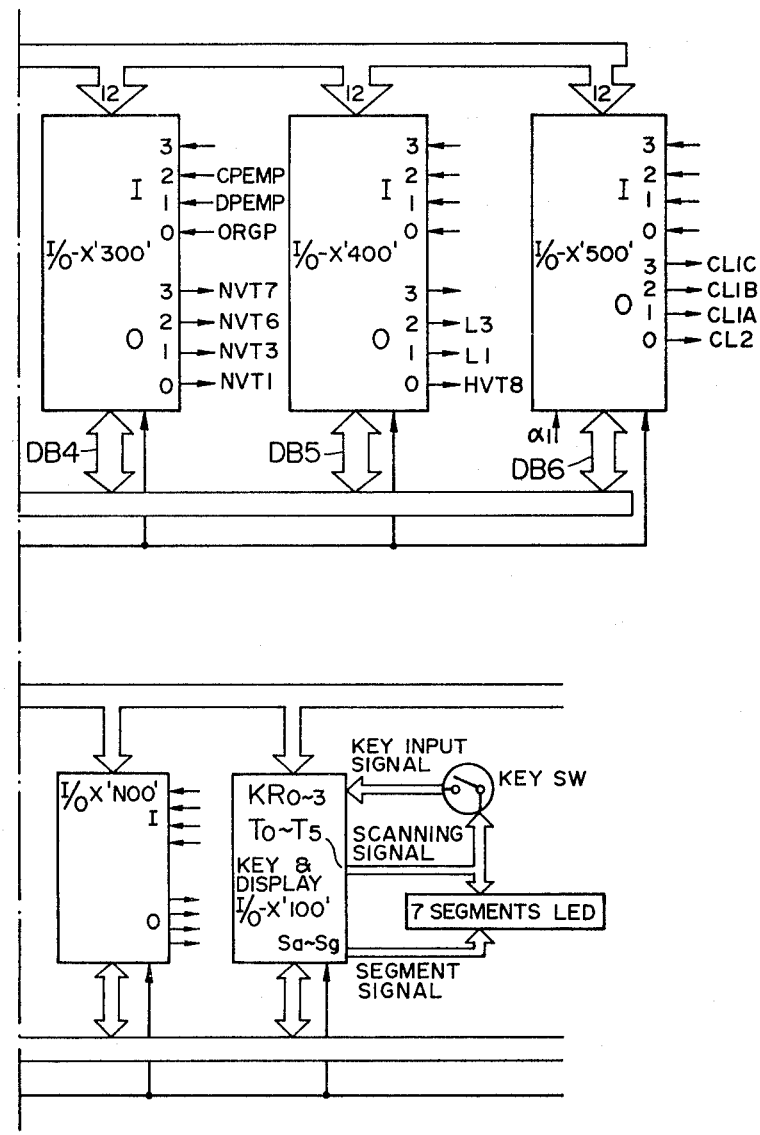

FIG. 13 shows a control circuit for executing the above-described processes which employs a microcomputer. FIG. 14 shows the map of RAM.

Figure 11:
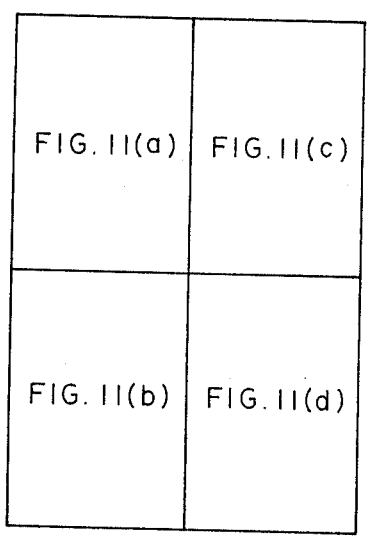

In FIG. 13, ROM is a read only memory which can incorporate into each address the sequence contents of the display operation of the key input data and the copying process operation of FIGS. 9–11 in a pre-arranged order and can take the content of each address every time the address is set, and which may be μ PD 454 commercially available from Nichiden-sha Co., Ltd.

RAM is a read/write memory for storing the number of copies and temporally storing the control signal during the process control, and it is a memory which stores a set of binary codes. The content of the RAM is particularly shown in FIG. 14. It comprises a plurality of sets of flip-flops and any desired set may be selected by an address designation signal to write or read the data into or out of a plurality of flips-flops of the selected set.

I/O 100–I/O NOO are input-output devices which read data input signals such as OHP signal, DHP signal, no-paper signal, key input signal, etc. and put out output signals for driving the clutches, solenoid, motors, etc. and which are successively driven by the sequence in the ROM.

As has hitherto been described, the time for operating the feed means is preset and stored for a predetermined time such that the leading end of the transfer medium and the leading end of the image contributing to the image transfer are brought into a predetermined positional relationship in accordance with the copying magnification, and the feed means is operatively controlled by the stored value, so that irrespective of the time of the image formation contributing to the image transfer, the image can be formed at a predetermined location on the transfer medium and moreover, this is always possible even when image transfer is repeatedly effected from one and the same image.

In the first and second embodiments, the starting points of the time until the optical system passes through the registered position and the time until the register clutch is driven are both set to the drum home position (particular position). However, such starting points may be set to different predetermined positions of the recording medium on which latent image is formed.

While the invention has been described with respect to the screen type copying apparatus, the invention is not restricted thereto but the invention is also applicable for the registration between paper and image during the image transfer in a copying apparatus wherein a usual photosensitive drum or a magnetic drum is exposed to image light to form an electrostatic or magnetic latent image, whereafter the latent image is developed and the developed image is transferred to transfer medium. That is, the present invention is effective in copying machines wherein the register rollers are driven before or after the image exposure is effected.

What we claim is:

1. A copying apparatus comprising,
   a rotatable recording medium;
   process means for forming an image, corresponding to an image of an original, on said recording medium, said process means including reciprocable means for scanning the original, and transfer means for transferring the image formed on said recording medium to a transfer medium.
   feed means for feeding a said transfer medium to an image transfer station;
   first detector means for detecting the presence of said reciprocable means at a predetermined position along a reciprocating path thereof;
   second detector means for detecting a particular position of said recording medium;
   memory means for storing, at least until termination of the scanning operation for the original by said reciprocable means, the time interval between outputs of said first and second detector means; and
   control means responsive to an output of said memory means for actuating said feed means, after the termination of the scanning operation, for accurately registering the recording medium image on the transfer medium at the transfer station.

2. The copying apparatus according to claim 1, further comprising means for generating a time signal in synchronism with the rotation of said recording medium.

3. The copying apparatus according to claim 2, wherein said time signal is a clock pulse signal.

4. An apparatus according to claim 3, further comprising counting means for counting the number of the pulses generated during said time interval, wherein said memory means stores the number of the pulses.

5. An apparatus according to claim 4, wherein said feed means is actuated when the stored number of the pulses and the number of the pulses generated from a predetermined position of the recording medium come under a predetermined relation.

6. An apparatus according to claim 5, wherein the detecting means is so placed that said predetermined relation is that they are equal.

7. An apparatus according to claim 5 or 6, wherein said particular position and said predetermined position of the recording medium are one and the same position.

8. A copy apparatus comprising,
   a rotatable recording medium;
   process means for forming an image on said recording medium at a plurality of selected magnifications with respect to the size of an original image, said process means including reciprocable means for scanning the original image and means for transferring the image on the recording medium to a transfer medium;
   feed means for feeding the transfer medium to a transfer station;
   first detector means for detecting the presence of said reciprocable means at a predetermined position along a reciprocating path thereof;
   second detector means for detecting a particular position of said recording medium;
   memory means for storing data corresponding to the time interval between outputs of said first and second detector means; and
   control means for actuating said feed means in response to an output of said memory means and the magnification selection, for accurately registering the recording medium image on the transfer medium at said transfer station.

9. The copying apparatus according to claim 8, further comprising means for generating a time signal in synchronism with the rotation of said recording medium.

10. The copying apparatus according to claim 9, wherein said time signal is a clock pulse signal.

11. An apparatus according to claim 10, further comprising counting means for counting the number of said clock pulses during said time interval, wherein said memory means stores said number of pulses.

12. An apparatus according to claim 11, wherein said control means actuates said feed means when the stored number of the pulses and the number of the pulses generated from a predetermined position of the recording medium come under a predetermined relation which is determined for each of the magnifications.

13. An apparatus according to claim 12, wherein said particular position and said predetermined position of the recording medium are one and the same position.

14. An apparatus according to claim 8, wherein said feed means is actuated after termination of the scanning operation of said reciprocable means.

15. A copying apparatus comprising:
   a rotatable recording medium;
   process means for forming an image on said recording medium, said process means including scanning means for scanning an original and transfer means for transferring the image on said recording medium to a transfer medium;
   means for feeding a said transfer medium to a transfer station;
   means for generating clock signals in synchronism with the rotation of said recording medium;
   means for counting said clock signals during movement of said scanning means from one particular position to another in correspondence with rotation of said recording medium; and feed control means for actuating said feed means after said clock signals are counted wherein the velocity of said recording medium differs from the time of scanning movement of said scanning means to the time when said transfer means is effecting the image transfer at said transfer station.

16. The copying apparatus according to claim 15, wherein the velocity of rotation of said recording medium is faster during the image transfer than during the scanning.

17. The copying apparatus according to claim 15, further comprising container means for containing transfer mediums and pick-up means for feeding the transfer mediums from within said container means to said feed means.

18. The copying apparatus according to claim 17, wherein said transfer medium forms a loop between said pick-up means and said feed means at the start of the operation of said feed means.

19. A copying apparatus comprising:
a rotatable recording medium;
process means for forming an image on said recording medium at a plurality of selected magnifications with respect to the size of an original, said process means including scanning means for scanning the original and means for transferring the image to a transfer medium;
means for feeding said transfer medium to a transfer station;
means for generating clock signals in synchronism with the rotation of said recording medium;
means for counting said clock signals during the time between when said recording medium is at a particular position and when said scanning means reaches a predetermined scanning position;
correction means for altering the count in said counter means in accordance with selections of said magnifications; and
feed control means for actuating said feed means after said clock signal has been counted by a number corresponding to the corrected value in said correction means as measured from the time said recording medium reaches a predetermined position.

20. The copying apparatus according to claim 19, wherein said feed control means includes comparator means for detecting the coincidence between said corrected value and the count of said clock signal from the predetermined position of said recording medium, and operates said feed means by the output of said comparator means.

21. The copying apparatus according to claim 19, wherein the scanning velocity of said recording medium differs in accordance with each of said magnifications.

22. The copying apparatus according to claim 21, wherein the velocity of rotation of said recording medium differs from the time when said scanning means is effecting the scanning to the time when said transfer means is effecting the image transfer.

23. The copying apparatus according to claim 22, wherein the velocity of rotation of said recording medium is faster during the image transfer than during the scanning.

24. The copying apparatus according to claim 21, further comprising container means for containing transfer mediums and pick-up means for feeding the transfer mediums from within said container means to said feed means.

25. The copying apparatus according to claim 24, wherein said transfer medium forms a loop between said pick-up means and said feed means at the start of the operation of said feed means.

26. A copying apparatus comprising:
a first image-bearing medium bearing thereon a first latent image corresponding to an original image;
a second image-bearing medium bearing thereon a second latent image corresponding to the image on said first image-bearing medium and movable in synchronism with the movement of said first image-bearing medium;
image forming means for forming the first latent image on said first image-bearing medium;
first transfer means for repetitively transferring said first latent image onto said second image-bearing medium;
second transfer means for transferring said second latent image to a transfer medium;
means for feeding the transfer medium to said second image-bearing medium;
means for detecting the position of the leading end of said first latent image on said first image-bearing medium;
hold means for holding the output of said detecting means during the operation of said first and second transfer means; and
means for controlling said feed means by the output of said hold means so that the leading end of said second latent image and the leading end of the transfer medium are brought into a predetermined positional relationship during the operation of said first and second transfer means.

27. The copying apparatus according to claim 26, wherein said image forming means includes means for scanning an original image to form the first latent image on said first image-bearing medium.

28. The copying apparatus according to claim 27, wherein said detecting means comprises two detecting members, namely, a first detecting member provided at a predetermined scanning position of said scanning means and a second detecting member provided at a predetermined position of said first image-bearing medium.

29. The copying apparatus according to claim 28, further comprising means for measuring the distance of movement of said first image-bearing medium from the detection output time of said second detecting member till the detection output time of said first detecting member, and wherein said hold means holds the output of said measuring means.

30. The copying apparatus according to claim 29, further comprising a member for detecting a particular position of said first image-bearing medium, and wherein said control means operates said feed means after said first image-bearing medium has moved over a distance corresponding to the distance of movement in said hold means from the detection output time of said detecting member.

31. The copying apparatus according to claim 26 or 27, wherein the velocities of movement of said first and second image-bearing mediums are faster during the operation of said first and second transfer means than during the operation of said image forming means.

32. The copying apparatus according to claim 31, wherein said first image-bearing medium is a screen-like photosensitive medium and the surface of said second image-bearing medium is an insulating material.

33. A copying apparatus comprising:
a first image-bearing medium bearing thereon a first latent image corresponding to an original image;
a second image-bearing medium bearing thereon a second latent image corresponding to the image on said first image-bearing medium and movable in synchronism with the movement of said first image-bearing medium;
image forming means for forming the first latent image on said first image-bearing medium at a plurality of magnifications with respect to the original image;
first transfer means for transferring said first latent image to said second image-bearing medium;
second transfer means for transferring said second latent image to a transfer medium;
means for feeding the transfer medium to said second image-bearing medium;
means for detecting a position corresponding to the leading end of the first latent image on said first image-bearing medium;
hold means for holding the output of said detecting means during the operation of said first and second transfer means;
means for controlling said feed means so that the leading end of the second latent image and the leading end of the transfer medium are brought into a predetermined positional relationship during the operation of said first and second transfer means in accordance with the output of said hold means and said magnifications.

34. The copying apparatus according to claim 33, wherein said image forming means includes means for scanning the original image to form the first latent image on said first image-bearing medium.

35. The copying apparatus according to claim 34, wherein said detecting means comprises two detecting members, namely, a first detecting member provided at a predetermined scanning position of said scanning means and a second detecting member provided at a predetermined position of said first image-bearing medium.

36. The copying apparatus according to claim 35, further comprising means for measuring the distance of movement of said first image-bearing medium from the detection output time of said second detecting member till the detection output time of said first detecting member, and wherein said hold means holds the output of said measuring means.

37. The copying apparatus according to claim 36, further comprising a member for detecting a particular position of said first image-bearing medium, and wherein said control means operates said feed means after said first image-bearing medium has moved, from the detection output time of said detecting member, over a distance corresponding to the distance of movement in said hold means corrected in accordance with each of said magnifications.

38. The copying apparatus according to claim 33 or 34, wherein the velocities of movement of said first and second image-bearing mediums are faster during the operation of said first and second transfer means than during the operation of said image forming means.

39. The copying apparatus according to claim 38, wherein said first image-bearing medium is a screen-like photosensitive medium and the surface of said second image-bearing medium is an insulating material.

* * * * *